(12) United States Patent
Kaimal et al.

(10) Patent No.: US 12,430,422 B2
(45) Date of Patent: Sep. 30, 2025

(54) RISK BASED REMOTE BROWSER ISOLATION

(71) Applicant: Sophos Limited, Abingdon (GB)

(72) Inventors: Biju Ramachandra Kaimal, Bangalore (IN); Joju Francis Olakengil, Bangalore (IN)

(73) Assignee: Sophos Limited, Abingdon (GB)

( * ) Notice: Subject to any disclaimer, the term of this patent is extended or adjusted under 35 U.S.C. 154(b) by 110 days.

(21) Appl. No.: 18/544,890

(22) Filed: Dec. 19, 2023

(65) Prior Publication Data

US 2024/0211589 A1    Jun. 27, 2024

(30) Foreign Application Priority Data

Dec. 23, 2022   (GB) ..................... 2219707
Dec. 23, 2022   (GB) ..................... 2219708

(51) Int. Cl.
*G06F 21/53*    (2013.01)
*G06F 21/57*    (2013.01)

(52) U.S. Cl.
CPC ............ *G06F 21/53* (2013.01); *G06F 21/57* (2013.01)

(58) Field of Classification Search
CPC ................................ G06F 21/53; G06F 21/57
See application file for complete search history.

(56) References Cited

U.S. PATENT DOCUMENTS

| | | |
|---|---|---|
| 10,558,824 B1 | 2/2020 | Remington et al. |
| 10,878,089 B2 * | 12/2020 | Zhang ................ G06F 21/56 |
| 11,468,142 B1 * | 10/2022 | Thornhill ............. H04L 67/06 |
| 12,250,243 B2 * | 3/2025 | Seiver ................. H04L 63/10 |
| 2016/0226914 A1 * | 8/2016 | Doddy ................. G06F 21/45 |
| 2022/0109700 A1 | 4/2022 | Guruswamy et al. |

FOREIGN PATENT DOCUMENTS

WO    WO-2016134346    8/2016

OTHER PUBLICATIONS

UKIPO, "UK Application No. GB2219707.3, Search Report dated Jun. 23, 2023", 4 pages.

* cited by examiner

*Primary Examiner* — Beemnet W Dada
(74) *Attorney, Agent, or Firm* — Strategic Patents, P.C.

(57) ABSTRACT

The present disclosure relates to a computer-implemented method for orchestration of remote browser isolation requests at a server. The method comprises receiving a first remote browser isolation (RBI) request associated with a first request to access a first network content at a first user device. A threat level associated with the first RBI request is determined and a container pool is assigned to the first RBI request based on the determined threat level. Using a first RBI container within the assigned container pool, a non-executable representation of the first network content is generated and returned for access at the first user device.

19 Claims, 11 Drawing Sheets

RISK BASED REMOTE BROWSER ISOLATION

CROSS-REFERENCE TO RELATED APPLICATIONS

This application claims priority to United Kingdom Pat. App. No. 2219707.3 filed on Dec. 23, 2022, and United Kingdom Pat. App. 2219708.1 filed on Dec. 23, 2022, where each of the foregoing applications is incorporated herein by reference in its entirety.

TECHNICAL FIELD

The present disclosure relates to secure web access solutions. Particularly, but not exclusively, the present disclosure relates to the orchestration of remote browser isolation requests. Particularly but not exclusively, the present disclosure relates to a computer-implemented method for orchestration of remote browser isolation requests to access non-executable representations of network content at a user device.

BACKGROUND

Remote Browser Isolation (RBI) is a technology wherein the web pages that a user is browsing to is rendered on the server side rather than on the browser on the user's device. Typically, a pixel representation of the web page or sanitized web content is sent back to the browser for rendering to prevent any malicious code-usually a script language code e.g., JavaScript®—from executing on the end user's device. When working in the context of a Secure Web Access (SWA) solution, web browsing requests are sent from the user's device to the SWA proxy which fetch content from the web site and return it to the device. Requests may also be processed by an intrusion prevention system (IPS) instead of a proxy. This allows policies to be administered at the SWA proxy where requests can be allowed, blocked, or isolated based on policy in a known manner typically dependent on the level of risk associated with the web browsing request.

In the isolation case, the SWA proxy can forward the request to an RBI server, which renders the web page and returns a pixel representation of the web page back to the proxy which returns it back to the device so that it can be rendered on the device. The RBI server typically runs as a browser (like Chrome®) and can handle requests for a limited number of web pages. Any cache data, cookies and other downloaded content are stored in separate directories on the server side.

One method of running the RBI server is to run it within a container. The container provides isolation for a user's content from other RBI sessions which would be running in other containers. One container can render multiple web page requests from the same user. However, not all content has the same threat profile which may lead to content being comprised in case of an attack from a web page which is able to access previously stored information from a different web page. To solve this, the RBI containers are run in different pools and the request to render is directed to an appropriate RBI container pool.

SUMMARY

The disclosure is directed towards a computer-implemented method for orchestration of RBI requests. Orchestration of RBI requests involves using a server to access network content in such a way as to isolate the network content from a user device, and then returning a safe version of the network content to the user device, such as by generating and returning a non-executable representation of the network content to the user device.

One aspect of the present disclosure relates to a computer-implemented method for orchestration of remote browser isolation requests. The method comprises receiving, at a server, a first RBI request associated with a first request to access a first network content at a first user device. A threat level associated with the first RBI request is determined, and the first RBI request is assigned to a container pool of a plurality of container pools based on the determined threat level. RBI requests associated with a first threat level are assigned to a first container pool of the plurality of container pools and RBI requests associated with a second threat level are assigned to a second container pool of the plurality of container pools. The first threat level is different to the second threat level. Using a first RBI container within the assigned container pool, a non-executable representation of the first network content is generated and returned from the server for access at the first user device.

Beneficially, this allows for container pools associated with a higher threat level to be quarantined or otherwise isolated from container pools associated with a lower threat level, increasing the security and efficiency of the system.

According to another aspect of the present disclosure, the present disclosure relates to a computer-implemented method for user-based pooling of remote browser isolation request. The method comprises receiving, at a server, a first RBI request associated with a first request to access a first network content at a first user device and determining, at the server, a first threat level associated with the first RBI request. A container pool of a plurality of container pools is identified based on the first threat level, the plurality of container pools comprising at least a first container pool to handle requests having a first threat level and a second container pool to handle requests having a second threat level, wherein the first threat level is different to the second threat level. A first user identifier associated with the first RBI request is determined at the server, and the first user identifier is associated with a first RBI container of the identified container pool. The requests associated with the first user identifier and the determined first threat level are handled by the first RBI container. Using the first RBI container within the identified RBI container, a non-executable representation of the first network content is generated and returned from the server for access at the first user device.

Beneficially, this allows for multiple requests from the same user associated with a unique user identifier to be handled by the same container. For a container pool with persistent storage of cached data or stored user profiles, this results in an improved and more efficient process between the user and the network content. It may also allow for increases in security of the user device and/or the server, as user-server-network content interaction can be more effectively monitored.

According to another aspect of the disclosure, the present disclosure relates to a computer-implemented method for orchestration of remote browser isolation, wherein a container pool of a plurality of container pools is assigned based on a determined threat level, and a container of a plurality of containers within the assigned contain of the plurality of container pools is assigned based on a determined user identifier. The method comprises receiving, at a server, a first RBI request associated with a first request to access a first network content at a first user device. A threat level associated with the first RBI request is determined and the server, and the first RBI request is assigned to a container pool of a plurality of container pools based on the determined threat level. RBI requests associated with a first threat level are assigned to a first container pool of the plurality of container pools and RBI requests associated with a second threat level are assigned to a second container pool of the plurality of container pools. The first threat level is different to the second threat level. A first user identifier associated with the first RBI request is determined at the server, and the first user identifier is associated with a first RBI container of the assigned container pool. The requests associated with the first user identifier and the determined threat level are handled by the first RBI container. Using the associated first RBI container within the assigned container pool, a non-executable representation of the first network content is generated and returned from the server for access at the first user device.

Beneficially, in addition to the benefits outlined above, using a container associated with a user identifier within a container pool assigned based on the threat level of the RBI request allows for an improved and more efficient process between the user and the network content without an increased risk of malware impacting either the server, the user device, or other users associated with the server. The combination of risk-based and user-based pooling can result in a container pool with persistent storage that is not accessible by another user when accessing low-risk network content, therefore increasing privacy and identity-related security, while simultaneously allowing for the quarantine of high-risk network content. This not only prevents malware from executing on the user device, but also prevents malware from impacting the orchestration of other RBI requests in the container pool, as another user would be assigned to different container within the container pool. Additionally, the user identifier may impact the determined threat level, for example a user identifier may be associated with network content of a higher risk and therefore the determined threat level may be higher for that user identifier.

BRIEF DESCRIPTION OF THE DRAWINGS

To facilitate a fuller understanding of the present disclosure, reference is now made to the accompanying drawings, in which like elements are referenced with like numerals. These drawings should not be construed as limiting the present disclosure but are intended to be illustrative only.

DETAILED DESCRIPTION

Figure 1A:
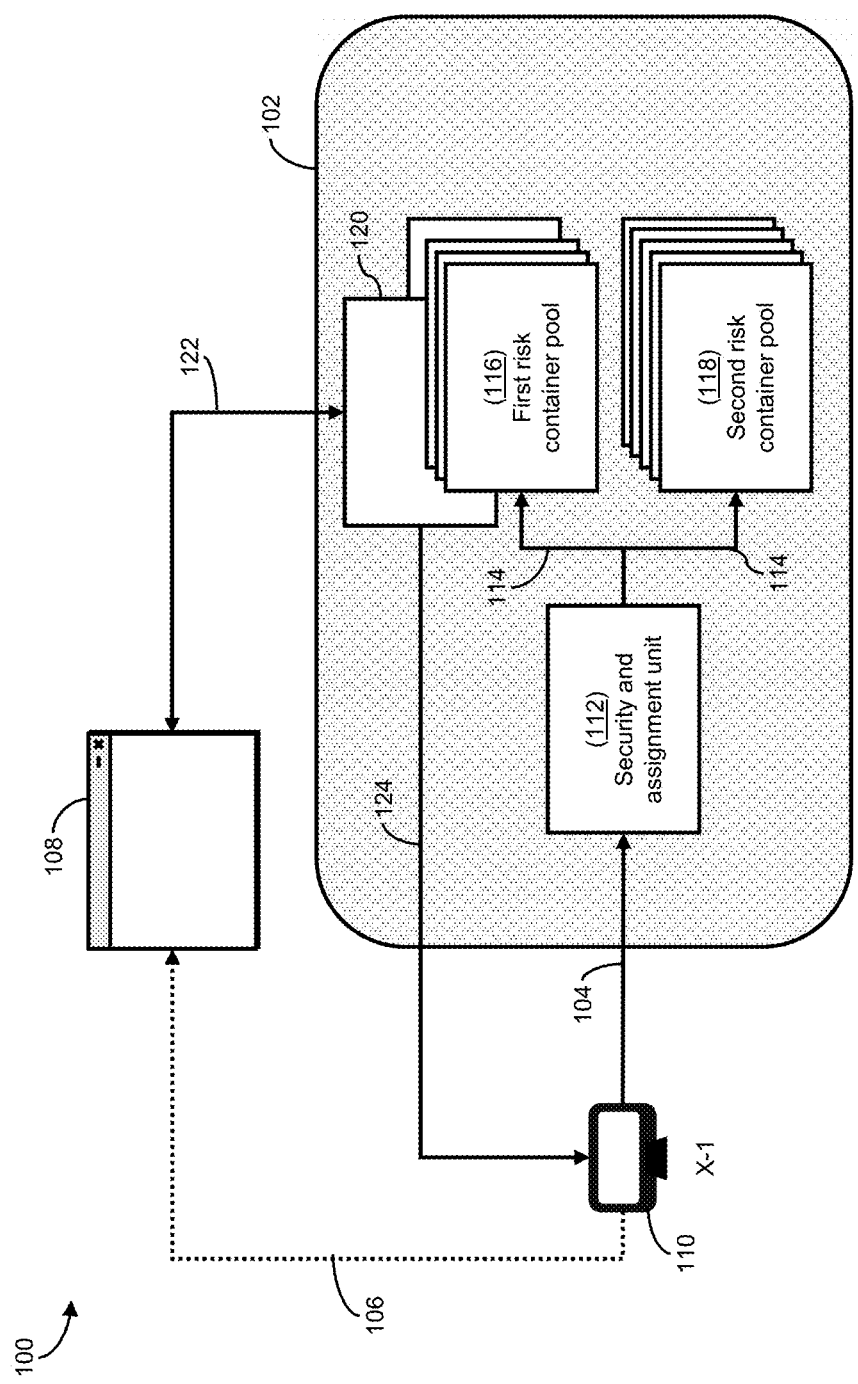
FIG. 1A-1B shows an example of a system architecture diagram for orchestration of RBI requests.

Embodiments of the present disclosure will be now described with reference to the attached figures. It is to be noted that the following description is merely used for enabling the skilled person to understand the present disclosure, without any intention to limit the applicability of the present disclosure to other embodiments which could be readily understood and/or envisaged by the reader. Whilst the present disclosure is primarily directed to the automatic configuration of security settings within a cloud environment, the skilled person will readily appreciate that the systems, methods, and devices of the present disclosure are applicable to other areas of cybersecurity and could be employed to determine recommended security configurations for private enterprise networks and the like.

In the present disclosure, references to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. The use of all examples, or exemplary language ("e.g.," "such as," "including," or the like) provided herein, is intended merely to better illuminate the embodiments, and does not pose a limitation on the scope of the embodiments or the claims.

The skilled person will appreciate that the systems and methods of the present disclosure are not limited to a single programming language or paradigm. Indeed, the systems and methods of the present disclosure are applicable to any suitable programming language or environment, including but not limited to Java, C, C++, any suitable assembly language, Python, C #, a script language code e.g., JavaScript, Ruby, PUP, and the like.

Some embodiments described herein may relate to a computer storage product with a transitory, or non-transitory, computer-readable medium (also can be referred to as a transitory, or non-transitory, processor-readable medium) having instructions or computer code thereon for performing various computer implemented operations. The computer-readable medium (or processor readable medium) is non transitory in the sense that it does not include transitory propagating signals per se (e.g., a propagating electromagnetic wave carrying information on a transmission medium such as space or a cable). The media and computer code (also can be referred to as code) is those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a transitory computer program product, which can include, for example, the instructions and/or computer code discussed herein.

Some embodiments and/or methods described herein can be performed by software (executed on hardware), hardware, or a combination thereof. Hardware modules include, for example, a general-purpose processor, a field programmable gate array (FPGA), and/or an application specific integrated circuit (ASIC). Software modules (executed on hardware) can be expressed in a variety of software languages (e.g., computer code), including C, C++, Java, Ruby, Visual Basic, Python, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

FIG. 1A shows a system for orchestration of RBI requests 100, wherein the system comprises a server 102, a first remote browser isolation (RBI) request 104, which is associated with a first request 106 to access a first network content 108 at a first user device 110, a security and assignment unit 112, an assignment 114, a first risk container pool 116, a second risk container pool 118, a first RBI container 120, a generated non-executable representation 122, and a returned non-executable representation 124.

The server 102 receives the first RBI request 104 from the first user device 110, which is an electrical device associated with a first user identifier. Examples of the user device 110 include, but are not limited to a smartphone, tablet, desktop, and laptop computer. The first RBI request 104 is associated with the first request 106 to access the first network content 108 at the first user device 110. The security and assignment unit 112, within the server 102, is configured to determine a threat level associated with the first RBI request 104, such as a first threat level, a second threat level, or another threat level. The first threat level is different to the second threat level. For example, the first threat level is less than the second threat level, such that requests associated with the first threat level are viewed as having lower risk than requests associated with the second threat level. The threat level is determined using information related to the user identifier associated with the first RBI request 104, the user device 110 associated with the first RBI request 104, and/or the network content 108 associated with the first RBI request 104, such as the URL.

In further examples the threat level may be determined using security policies set locally, or by a network administrator. Such policies may include any known methods such as list of excluded websites, analysis of the webpage for malicious code or behavior etc. Such policies may assign a threat level according to the level of determined, or perceived, threat. The determination of the threat level preferably occurs using known techniques. The methods for the determination of the threat level are applicable to all the examples and embodiments of the invention described herein.

The security and assignment unit 112 is further configured to determine an assignment 114, such that the first RBI request 104 is assigned to a container pool based on the determined threat level. Therefore, the assignment 114 is proxy or measure of risk associated with the determined threat level.

The RBI requests associated with the first threat level are assigned to the first risk container pool 116 and RBI requests associated with the second threat level are assigned to the second risk container pool 118. The server 102 may comprise additional container pools not depicted here for ease of understanding. The assignment 114 may also identify the container within the assigned container pool wherein the first RBI request 104 is assigned. In an example where security and assignment unit 112 determines that the first RBI request 104 is associated with a first threat level, the assignment 114 is provided such that the first RBI request 104 is assigned to the first risk container pool 116 and a first RBI container 120 within the first risk container pool 116.

A container is given an assignment 114 by any suitable computational methods, such as the first free container in a sequence, random allocation, or a user-based method as detailed below.

The first RBI container 120 is configured to obtain a generated non-executable representation 122 of the first network content 108. A returned non-executable representation 124 of the network content is then obtained by the first user device 110 from the server 102. As the content is a non-executable representation 122 of the first network content 108 the risk, such as the possibility of malicious content being present, is greatly reduced.

Server 102 is a multi-server environment comprising of one or more servers. In the present figures a single server is shown for ease of understanding, in further examples multiple servers is present. For example, server 102 is a server within a multi-server environment. The first user device 110 may comprise of one or more electronic devices and/or systems. Electronic devices and/or systems are labelled here as X, wherein one electronic device and/or system is labelled X-1, any second electronic device and/or system is labelled X-2, up to an Nth electronic device and/or system labelled X-N. Only X-1 is depicted in FIG. 1 for ease of understanding, and X-1 represents an electronic device such as a computing device. However, any relevant electronic device and/or system is the first user device 110, and the first user device 110 may comprise multiple electronic devices. Additionally, X-1 is a proxy, and therefore the first request 106 is received by the server 102 from a proxy, or X-1 is a system, e.g., the first request 106 is received from an intrusion prevention system. Preferably, first request 106 is associated with a request to isolate the first network content from the first user device. Optionally, server 102 is a secure web access solution, and/or the first RBI request is a request for server 102 to access the network content, isolated from the first user device 110, and provide the returned non-executable representation 124.

The first network content 108 is a web page, and a non-executable representation of the first network content 108 is generated by a web browser executing within the first RBI container 120, or the web browser is first RBI container 120 in a known manner in RBI execution. For example, the first request 106 is associated with a request to isolate the web page from the first user device, and/or associated with an action on the first user device 110, such as clicking on a web-link or entering the address of a website in a web-browser.

The security and assignment unit 112 may determine the threat level associated with the first RBI request 104 using a security policy. The security policy is that associated with the first user device 110, a first user identifier linked to the first user device 110, the server 102, and/or the network content 108. Alternatively, the security policy is that set by a network, or enterprise administrator. The precise nature of the security policy may change according to the usage scenario. The skilled person will realize that the principles of the invention described herein will remain the same notwithstanding the precise policy used.

The first risk container pool 116 is associated with a first content access policy, and the second risk container pool 118 is associated with a second content access policy. As with the security policy the precise nature of the access policies may vary depending on the usage of the invention.

For example, a content access policy, such as the first content access policy, may allow persistent storage of cached data. Another content access policy, such as the second content access policy, may not allow storage of cached data. For example, the second content access policy may restrict the storage of cached data. In this example, cookies would not be stored under the second content access policy. This allows for the persistent storage of cached data only related to network content that is trusted by the access policy provider. An example of network content that is not trusted by the access policy provider is network content that has not been accessed previously and/or where the source is not easily traceable or otherwise known.

There may be additional container pools, not depicted here. For example, RBI requests associated with a third threat level is assigned to a third container pool of the plurality of container pools. The third threat level is greater than the first threat level and less than the second threat level. In this example, the third threat level is associated with network content that is more trusted than network content associated with the second threat level, but less trusted than network content associated with the first threat level.

The first RBI container 120 may generate a non-executable representation of the first network content 108 by accessing the first network content 108 and generating a pixel-based representation of the first network content 108. Alternatively, the first RBI container 120 may generate a copy of the first network content 108 with lower, or selectively disabled, functionality. Examples of lower, or selectively disabled functionality include disabling or removal of hyperlinks to different network content, removal of macros, functioning programming language code (e.g., a script language code e.g., JavaScript). etc., removal of certain functionality. Such examples are non-exclusive and other functionality is removed or disabled.

The returned non-executable representation 124 is the generated non-executable representation 122. Alternatively, server 102 is configured to further process or otherwise assess generated non-executable representation 122, such that returned non-executable representation 124 may differ from the generated non-executable representation 122. For example, the returned non-executable representation 124 is altered based on the first user device 110, such as being a lower resolution than generated non-executable representation 122, or otherwise altered based on security and/or access policies associated with the first user device 110.

Figure 1B:
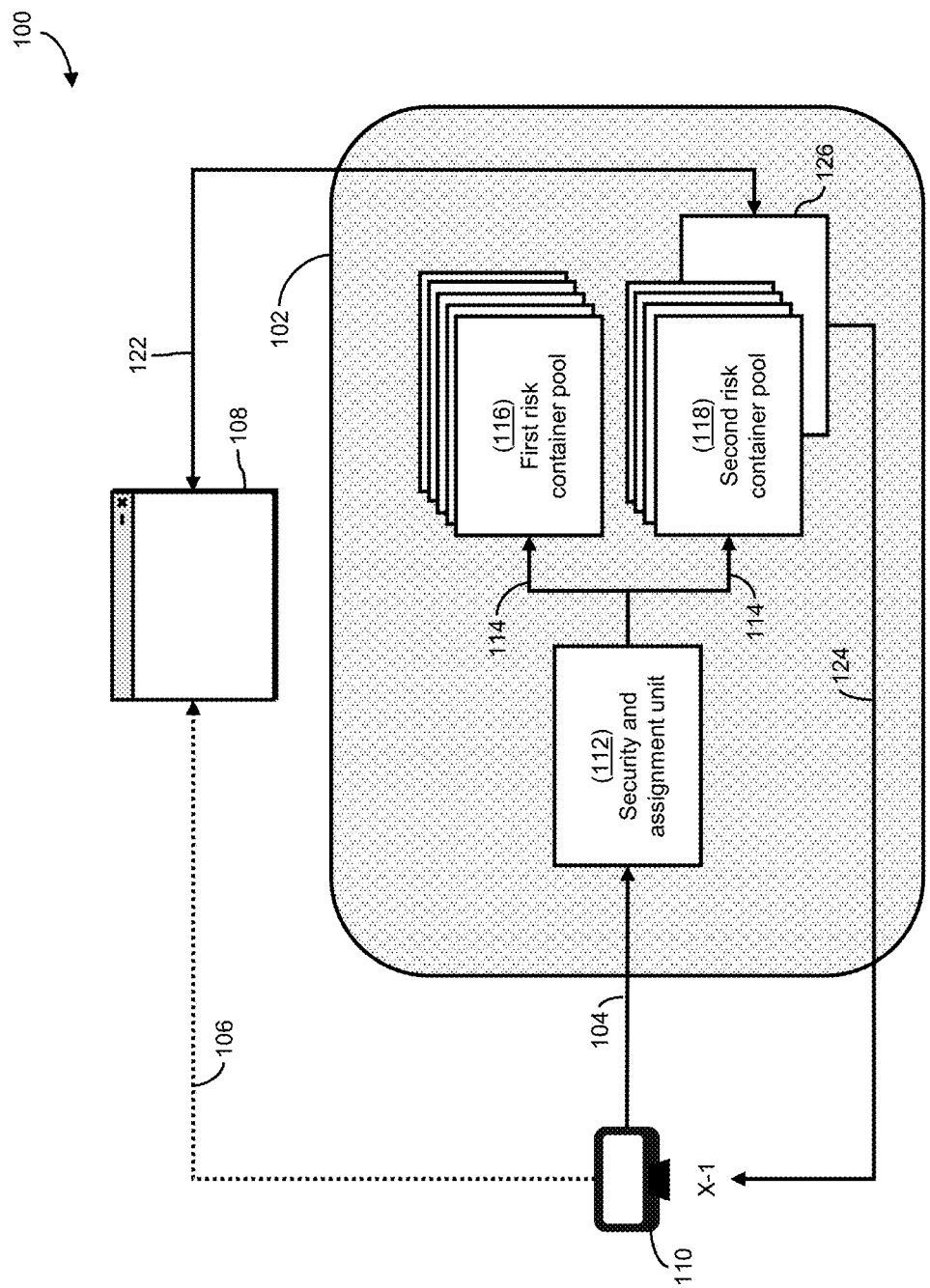

FIG. 1B also shows the system for orchestration of RBI requests 100, wherein the system comprises further comprises a second RBI a second RBI container 126. In FIG. 1A, the first network content 108 was associated with a first threat level, determined by the security and assignment unit 112. The assignment 114 was provided such that the first RBI request 104 was assigned to the first risk container pool 116 and a first RBI container 120 within the first risk container pool 116. In FIG. 1B, security and assignment unit 112 determined that the threat level associated with the first network content 108 is the second threat level. Therefore, assignment 114 is provided by security and assignment unit 112 such that the first RBI request 104 is assigned to the second risk container pool 118 and a second RBI container 126 within the second risk container pool 118.

The first network content 108 is a web page, and the web page is generated by a web browser executing within the first RBI container 120. Additionally, or alternatively, the non-executable representation 124 of the first network content is a pixel-based representation of the first network content 108, or an otherwise sanitized representation of the first network content 108. For example, the non-executable representation 124 of the network content is rendered so as to prevent any malicious code, such as a script language code e.g., JavaScript®, from executing on the user device (X-1). The RBI request 104 is received from a user device 110, a server 102, a proxy, an intrusion prevention system and/or any electronic device and/or system. Preferably, the RBI request 104 is associated with a request to isolate the first network content 108 from the first user device 110. The generation of the pixel-based representation of the first network content 108 occurs in a known manner.

The second container pool 118 is preferably isolated from the first container pool 116, and/or the first container pool 116 is associated with a first content access policy and the second container pool is associated with a second content access policy, wherein the first content access policy may allow for persistent storage of cached data while the second content access policy may restrict the storage of cached data.

RBI requests associated with an optional third threat level are assigned to a third container pool of the plurality of container pools, and the third threat level is greater than the first threat level and less than the second threat level. For example, the first threat level is associated with low-risk network content, the second threat level is associated with high-risk network content, and the third threat level is associated with medium-risk network content. Optionally, the first threat level, second threat level, and optional third threat level, are determined by a security policy.

In additional examples further threat levels having their associated container pools is defined and used.

Figure 2:
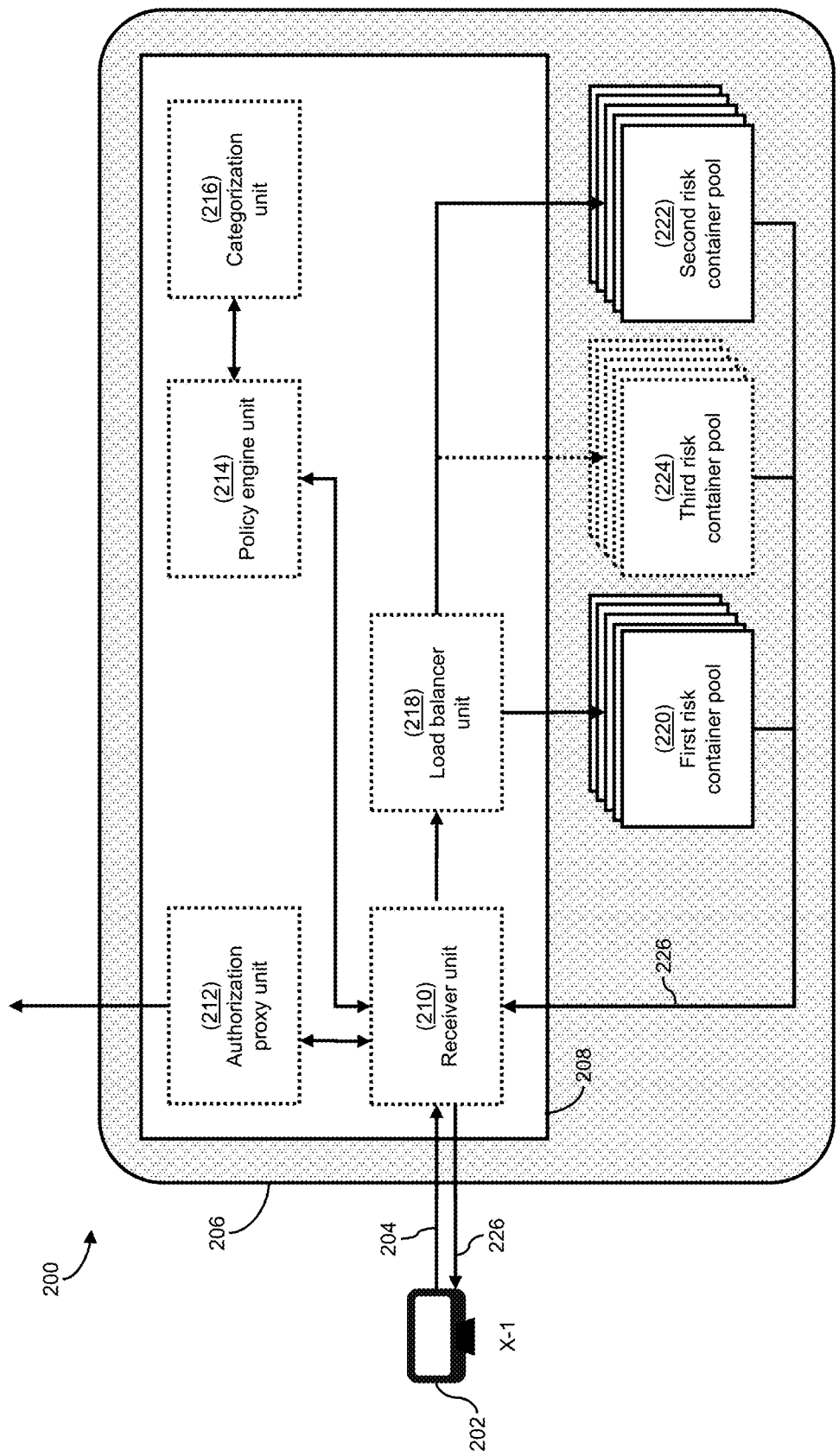
FIG. 2 shows an example of a system architecture diagram for orchestration of RBI requests utilizing a proxy.

FIG. 2 shows an example of a system architecture diagram for orchestration of RBI requests utilizing a proxy. Specifically, FIG. 2 illustrates an example variation of the system described in FIGS. 1A-1B.

The system 200 comprises a user identifier 202, which is associated with a user device (depicted here as X-1), a first RBI request 204, which is associated with a first request to access a first network content, a server 206, a security and assignment unit 208, an receiver unit 210, an authorization proxy unit 212, a policy engine unit 214, a categorization unit 216, a load balancer unit 218, a first risk container pool 220, a second risk container pool 222, an optional third risk container pool 224, and a non-executable representation of the network content 226.

The server 206 receives a first RBI request 204 from a user device (X-1) and is configured to return the non-executable representation of the network content 226 associated with the first RBI request 204 to the user device (X-1).

The receiver unit 210 is configured to obtain the first RBI request 204 from the user device (X-1) and is optionally communicatively coupled to any one or more of the authorization proxy unit 212, the policy engine unit 214, and/or the load balancer and router unit. The receiver unit 210 is an envoy proxy unit, an intrusion prevention system (IPS), and/or security and assignment unit 112 of FIG. 1.

The authorization proxy unit 212 may obtain user-related information associated with the first RBI request 204, such as the user identifier, from the receiver unit 210. The authorization proxy unit 212 may administer protocols based on the user-related information associated with the first RBI request 204, such as whether the user identifier is authorized to access server 206, or network-content-related information associated with the first RBI request 204, such as whether the first network content is blocked, allowed, or requires isolating. The authorization proxy is further configured to send and/or receive information outside of system 200, such as exporting the user identifier for access checking or importing user access policies. The receiver unit 210 is further configured to forgo the ongoing processes based on policies administered by the authorization proxy unit 212. For example, the user identifier 202 does not have access to server 206, and the receiver unit 210 may not return a non-executable representation of the first network content to the user device (X-1) based on the user identifier 202. In another example, the first network content associated with the first RBI request 204 is blocked by a protocol or other policy administered by the authorization proxy unit 212, and the non-executable representation of the network content 226 is not returned for access at the user device (X-1).

The policy engine unit 214 is configured to administer security policies to the receiver unit 210 associated with the first RBI request 204. The categorization unit 216 is configured to obtain first RBI request 204 from the receiver unit 210 and categorize the first RBI request 204. For example, categories can be based on security policies provided by the policy engine unit 214, such as allowing the user device (X-1) to access the network content directly, denying the user device and/or the server 206 access to the network content, or isolating the network content from the user device (X-1). Categorization unit 216 is further configured to classify the first RBI request 204 based on the network content associated with the first RBI request 204, such as the URL.

The load balancer unit 218 is configured to obtain the first RBI request 204 from the receiver unit 210 and forward the first RBI request 204 to an assigned container pool from a plurality of container pools. The server 206 comprises at least one container pool. A container pool is assigned based on a determined risk associated with the first RBI request 204. For example, the first RBI request 204 is associated with a first threat level, and the first RBI request 204 is assigned to a first risk container pool 220. The first RBI request 204 is associated with a second threat level, and the first RBI request 204 is assigned to a second risk container pool 222. There is at least one additional optional threat level, such that the first RBI request 204 is associated with a third threat level, and the first RBI request 204 is assigned to a third risk container pool 224. The third threat level is greater than the first threat level and less than the second threat level. For example, the first threat level is associated with low-risk network content, the second threat level is associated with high-risk network content, and the third threat level is associated with medium-risk network content. Optionally, the first threat level, second threat level, and optional third threat level, are determined by a security policy.

The load balancer unit 218 is further configured to assign the first RBI request 204 to a container within a container pool based on a current load associated with one or more containers within one or more container pools. Optionally, the load balancer unit 218 is further configured to assign the first RBI request 204 to a container within a container pool based on at least one of the determined threat levels associated with the first RBI request 204, information relating to the user identifier 202 associated with the first RBI request 204, information relating to the user device (X-1) associated with the first RBI request 204, and/or other factors.

A non-executable representation of the network content 226 associated with the first RBI request 204 is generated by the assigned container, and the non-executable representation of the network content 226 is then returned by the receiver unit 210 for access by the user device (X-1) and/or the user associated with the user identifier 202. For example, the non-executable representation of the network content 226 is rendered so as to prevent any malicious code, such as a script language code e.g. JavaScript®, from executing on the user device (X-1). Preferably, the non-executable representation of the network content 226 is a sanitized version of the network content, such as a pixel representation of the network content.

The non-executable representation of the network content 226 is generated by a browser, such as Chrome®, inside the server 206, and the network content is a web page. Each container can handle RBI requests from at least one web page. A user profile of network content related data, such as cache, cookies, and other downloaded content, is stored in separate directories within the server 206, such as when network content is accessed from a container within the first risk container pool 220. In one example, the containers are isolated such that a user profile associated with user identifier 202 is isolated from other containers within the container pool. Additionally, the containers are isolated from the containers of separate container pools. For example, a user profile associated with network content accessed from a container within the first risk container pool 220 is stored by the server but inaccessible to containers within the second risk container pool 222. Optionally, a user profile is not generated and/or stored when network content is accessed from a container pool that is isolated from other container pools, and/or wherein the containers within the container pool are isolated, such as the second risk container pool 222.

Optionally, the server 206 may comprise only the security and assignment unit 208 and the first risk container pool 220. Alternatively, the server 206 may comprise any of the above-described units in any combination. Additionally, or alternatively, server 206 is server 102, security and assignment unit 208 is security and assignment unit 112, first risk container pool 220 is first risk container pool 116, second risk container pool 222 is second risk container pool 118, and/or the non-executable representation of the network content 226 is the generated non-executable representation 122 and returned non-executable representation 124 of FIGS. 1A-1B.

Optionally, the first network content is a web page, and the web page is generated by a web browser executing within the first RBI container. Additionally, or alternatively, the non-executable representation of the first network content 226 is a pixel-based representation of the first network content, or an otherwise sanitized representation of the first network content as previously described. The RBI request 204 is received from a user device, a server, a proxy, an intrusion prevention system and/or any electronic device and/or system. Preferably, the RBI request 204 is associated with a request to isolate the first network content from the first user device.

The second risk container pool 222 is isolated from the first risk container pool 220, the first container pool 220 is associated with a first content access policy and the second container pool 222 is associated with a second content access policy, and/or the first content access policy allows persistent storage of cached data while the second content access policy restricts the storage of cached data.

Figure 3A:
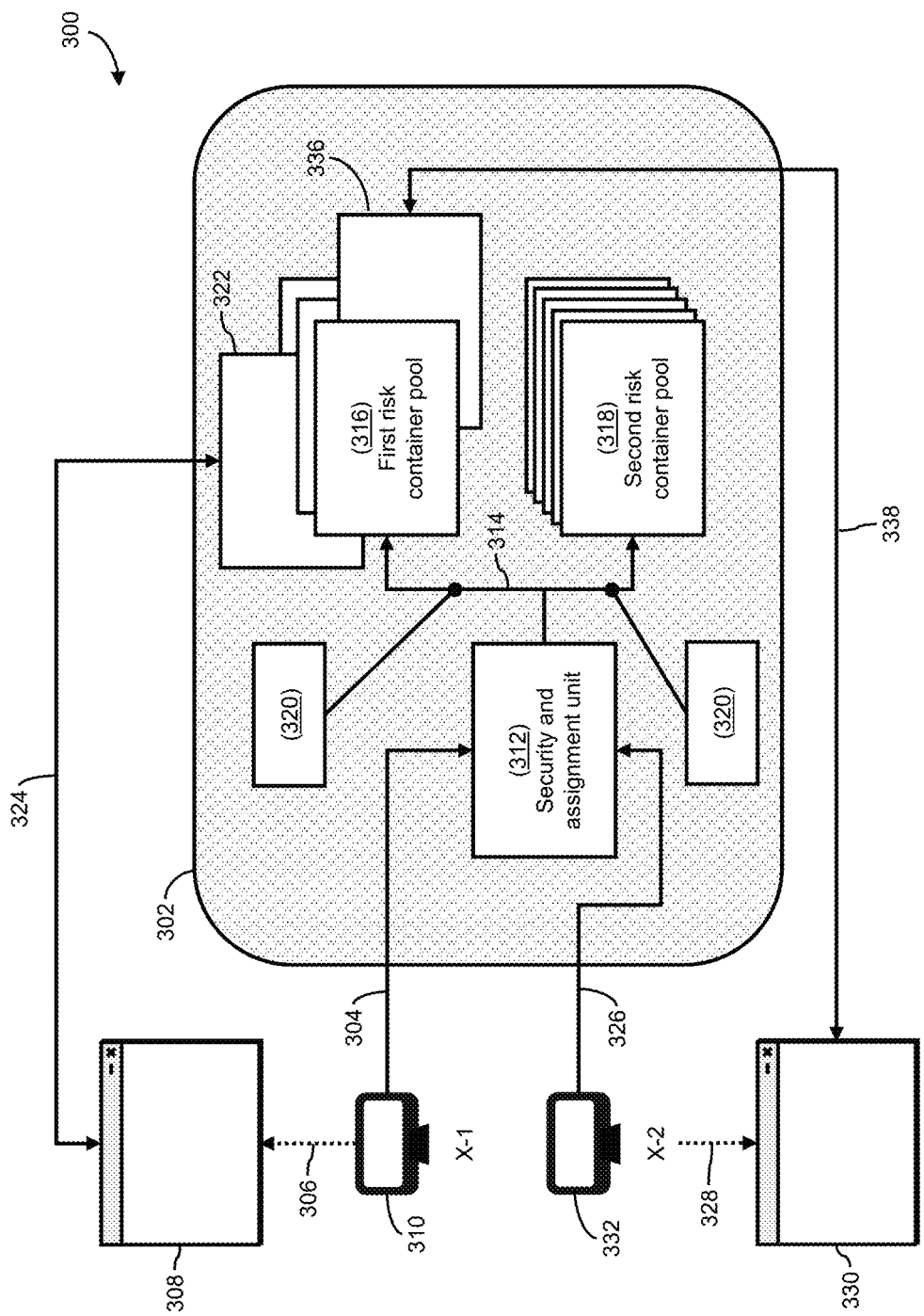
FIG. 3A-3C shows an example of a system architecture diagram for user-based pooling of RBI requests.
Figure 3B:
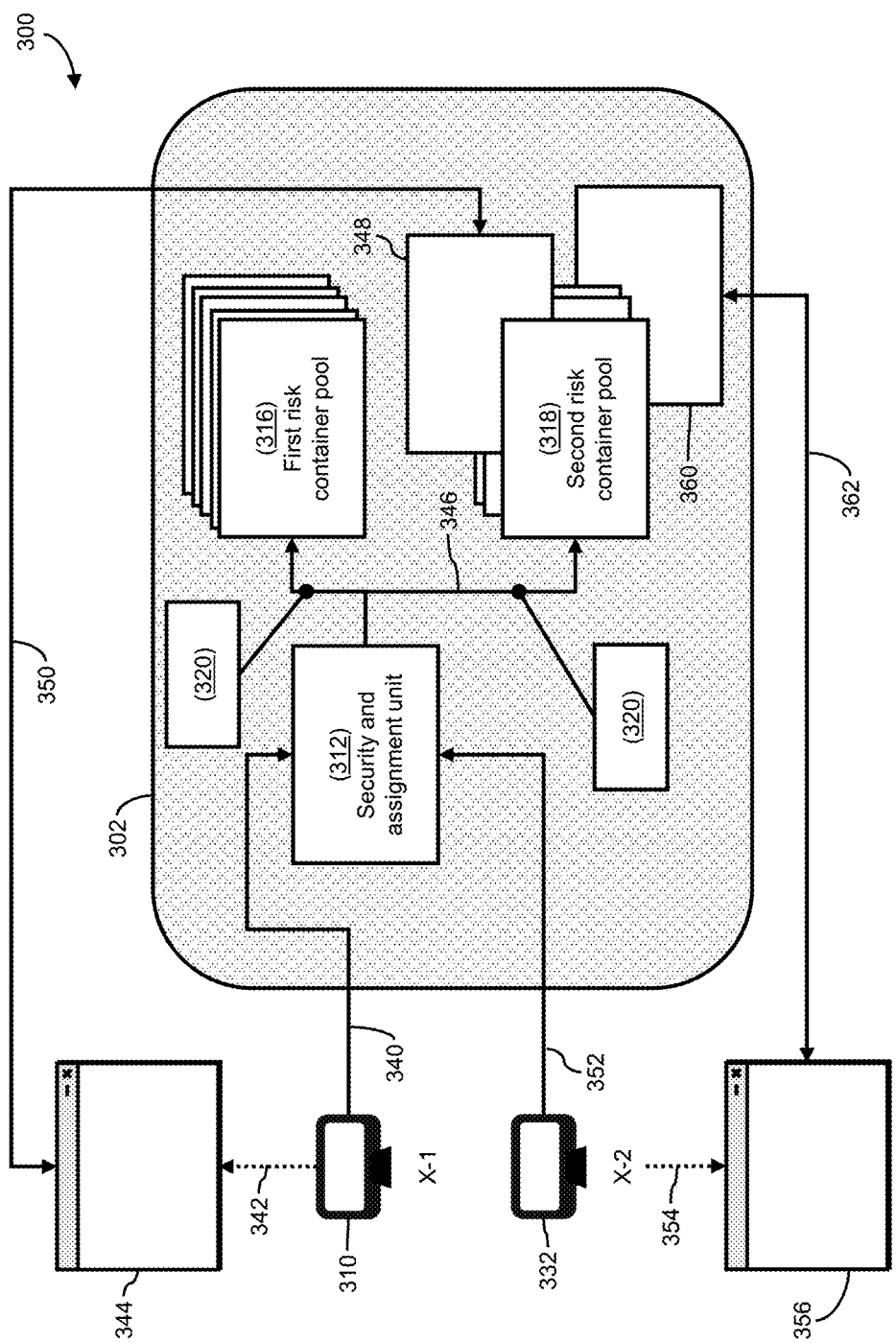
Figure 3C:
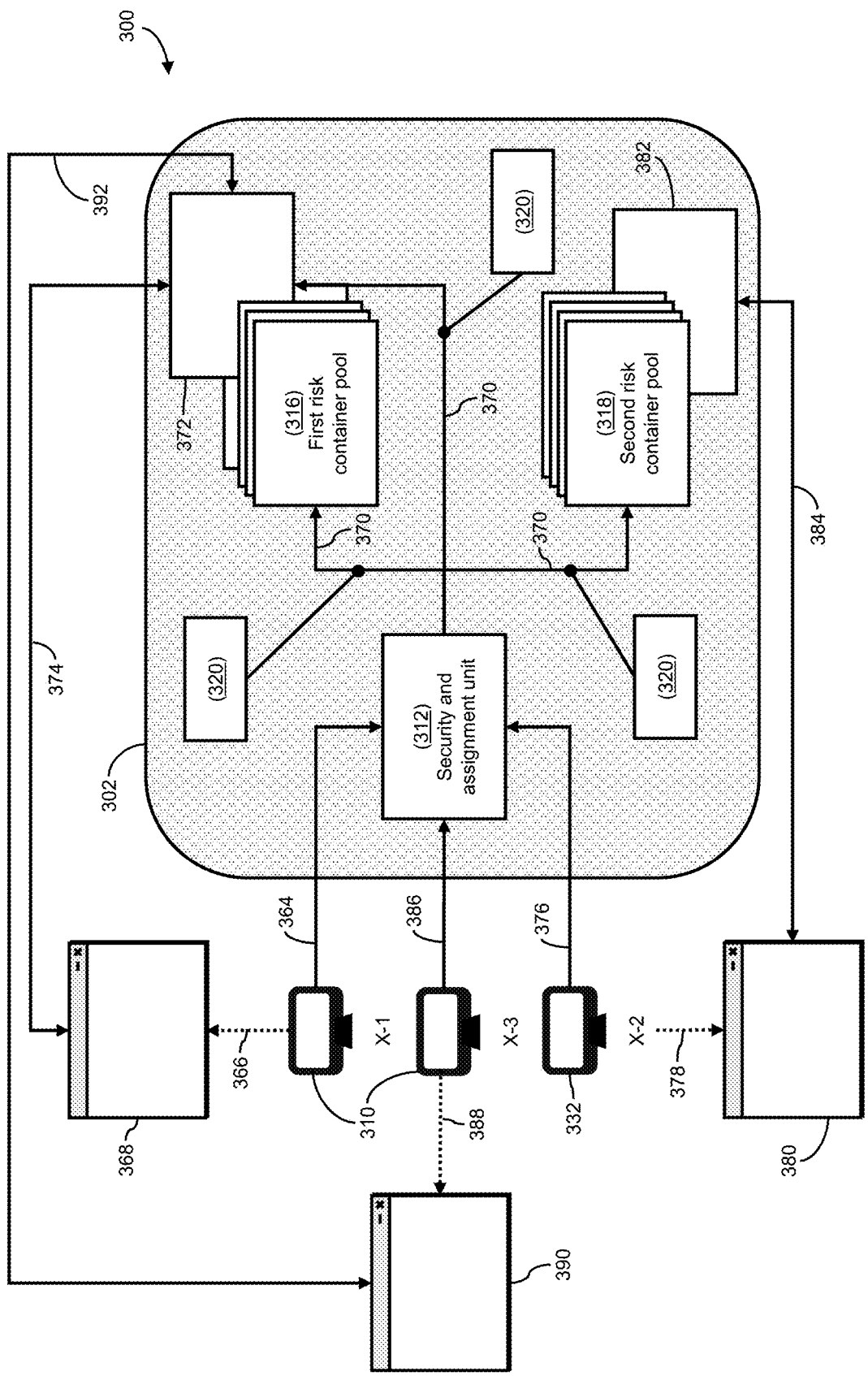

FIGS. 3A-3C show an architecture illustrating a system 300 for user-based pooling of RBI requests.

FIG. 3A illustrates an example with two different RBI requests associated with two different user identifiers at a determined first threat level. The system comprises a server 302, a first RBI request 304, which is associated with a first request 306 to access a first network content 308 at a first user device (depicted here as X-1), a first user identifier 310, a security and assignment unit 312, an assignment 314, a first risk container pool 316, a second risk container pool 318, an identification unit 320, a first RBI container 322, a non-executable representation of the first network content 324, a second RBI request 326, which is associated with a second request 328 to access a second network content 330 at a second user device (depicted here as X-2), a second user identifier 332, a second RBI container 336, a non-executable representation of the second network content 338.

The server 302 receives the first RBI request 304, which is associated with a first request 306 to access a first network content 308 at a first user device (X-1). There is a first user identifier 310 associated with the first RBI request 304. The server 302 then determines at the security and assignment unit 312 a threat level associated with the first RBI request 304, wherein there is at least one threat level, which in this example is a first threat level. The threat level is determined using information related to the first user identifier 310 associated with the first RBI request 304, the user device (X-1) associated with the first RBI request 304, and/or the network content 308 associated with the first RBI request 304, such as the URL. The security and assignment unit 312 identifies a container pool from a plurality of container pools based on the determined threat level, producing an assignment 314. The assignment 314 assigns the first RBI request 304 to the identified container pool, for example the first risk container pool 316.

The plurality of container pools comprises at least the first risk container pool 316 and a second risk container pool 318. The first risk container pool 316 handles requests associated with the first threat level and the second risk container pool 318 handles requests associated requests not associated with the first threat level, such as requests associated with a second threat level. The second threat level is different to the first threat to level. For example, the second threat level would be associated with higher risk network content than the first threat level.

The first user identifier 310 associated with the first RBI request 304 is determined by the identification unit 320, such as by a user authentication process. The first user identifier 310 is associated with a first RBI container 322 of the identified container pool (e.g., the first risk container pool 316) such that requests associated with the first user identifier 310 and the determined first threat level (e.g., the first threat level) are handled by the first RBI container 322. The assignment 314 is modified by the identification unit 320 to assign the first RBI request 304 the associated first RBI container 322.

Using the first RBI container 322, the non-executable representation of the first network content 324 is generated. The non-executable representation of the first network content 324 is then returned from the server 302 for access at the first user device (X-1).

Optionally, the server receives a second RBI request 326, which is associated with a second request 328 to access a second network content 330 at a second user device (X-2). The server 302 receives the second RBI request 326, wherein there is a second user identifier 332 associated with the second RBI request 326. A threat level associated with the second RBI request 326 is determined by the security and assignment unit 312, which in this example is also the first threat level. The assignment 314 produced by the security and assignment unit 312 assigns the second RBI request 326 to the identified container pool, which is also the first risk container pool 316. The second user identifier 332 associated with the second RBI request 326 is determined by the identification unit 320. The second user identifier 332 is associated with a second RBI container 336 of the identified container pool (e.g., the first risk container pool 316) such that requests associated with the second user identifier 332 and the determined first threat level are handled by the second RBI container 336. The assignment 314 is modified by the identification unit 320 to assign the second RBI request 326 to the associated second RBI container 336. Using the second RBI container 336, the non-executable representation of the second network content 338 is generated. The non-executable representation of the second network content 338 is then returned from the server 302 for access at the second user device (X-2).

In this example, even though the determined threat level of the requests associated with each user identifier are the same, the assigned container associated with each request is different. The first RBI container 322 is uniquely associated with the first user identifier 310 such that the first RBI container 322 only handles requests associated with the first user identifier 310 and the first threat level. Alternatively, or additionally, the first RBI container 322 is uniquely associated with the first user identifier 310 such that the first RBI container 322 handles all requests associated with the first user identifier 310 and the first threat level. In this example, as the second user identifier 332 is different to the first user identifier 310, the RBI container associated with each user identifier is different. However, in another example, a single RBI container is associated with more than one user identifier.

FIG. 3B shows the system of FIG. 3A, illustrating an example with two different RBI requests associated with two different user identifiers at a determined second threat level.

The system comprises a server 302, a third RBI request 340, which is associated with a third request 342 to access a third network content 344 at a first user device (X-1), a first user identifier 310, a security and assignment unit 312, an assignment 346, a first risk container pool 316, a second risk container pool 318, an identification unit 320, a third RBI container 348, a non-executable representation of the third network content 350, a fourth RBI request 352, which is associated with a fourth request 354 to access a fourth network content 356 at a second user device (X-2), a second user identifier 332, a fourth RBI container 360, a non-executable representation of the fourth network content 362.

The server receives a third RBI request 340, which is associated with the third request 342 to access the third network content 344 at the first user device (X-1). The server 302 receives the third RBI request 340, wherein the first user identifier 310 is associated with the third RBI request 340. A threat level associated with the third RBI request 340 is determined by the security and assignment unit 312, which in this example is the second threat level. The assignment 346 produced by the security and assignment unit 312 assigns the third RBI request 340 to the identified container pool, which is the second risk container pool 318. The first user identifier 310 associated with the third RBI request 340 is determined by the identification unit 320. The first user identifier 310 is associated with a third RBI container 348 of the identified container pool (e.g., the second risk container pool 318) such that requests associated with the first user identifier 310 and the determined second threat level are handled by the third RBI container 348. The assignment 346 is modified by the identification unit 320 to assign the third RBI request 340 to the associated third RBI container 348. Using the third RBI container 348, the non-executable representation of the third network content 350 is generated. The non-executable representation of the third network content 350 is then returned from the server 302 for access at the first user device (X-1).

The fourth RBI request 352 is also associated with the second threat level by the security and assignment unit 312 and is also assigned to the second risk container pool 318. However, the second user identifier 332 is different to the first user identifier 310, and the RBI container associated with each user identifier is different. While the container pool is associated with the threat level, the assigned container within the container pool is associated with the user identifier, as previously described. Therefore, each user has their own container pool even if the threat level is shared. This helps ensure security across the system.

The first user identifier 310 is unique to a particular user, such as a unique identifier associated with a user of the first user device (X-1) or shared among multiple users. For example, the first user identifier 310 is used by multiple users associated with one or more organizations, such as employees of a business. In another example, a single user is associated with multiple user identifiers. Optionally, the first user identifier 310 is associated with the first user device and/or the electronic device/system associated with the first RBI request 304, such that an identifier associated with the first user device and/or electronic device/system is used as the first user identifier 310, e.g., a serial number. Optionally, the first user device and the second user device are the same electronic device/system, such that X-1 and X-2 are the same device, which is associated with both the first user identifier 310 and the second user identifier 332. Optionally, the first network identifier 310 and second network identifier 332 is the same network identifier, and/or associated with the same user.

FIG. 3C shows the system of FIG. 3A but illustrates an example where the RBI request associated with the first user identifier 310 is determined to be a different threat level than the RBI request associated with the second user identifier 332. Additionally, FIG. 3C further illustrates an example where two RBI requests associated with the first user identifier 310 at the same threat level are assigned to the same container.

The system 300 comprises the server 302, a fifth RBI request 364, which is associated with a fifth request 366 to access a fifth network content 368 at the first user device (X-1), the first user identifier 310, the security and assignment unit 312, an assignment 370, the first risk container pool 316, the second risk container pool 318, the identification unit 320, a fifth RBI container 372, a non-executable representation of the fifth network content 374, a sixth RBI request 376, which is associated with a sixth request 378 to access a sixth network content 380 at the second user device (X-2), the second user identifier 332, a sixth RBI container 382, a non-executable representation of the sixth network content 384, a seventh RBI request 386, which is associated with a seventh request 388 to access a seventh network content 390 at a third user device (X-3), and a non-executable representation of the seventh network content 392.

The fifth RBI request 364 is associated with the first user identifier 310 and is assigned to the fifth container 372 of the first risk container pool 316, using the process previously described. The non-executable representation of the fifth network content 374 is generated by the fifth container pool 372 and returned to the first user deice (X-1). The sixth RBI request is associated with the second user identifier 332 and is assigned to the sixth container pool 382 of the second risk container pool 318. The non-executable representation of the sixth network content is generated by the sixth container pool 382 and returned to the second user device (X-2). In this example, the security and assignment unit 312 determined that the fifth RBI request 364 is associated with a first threat level and the sixth RBI request 376 is associated with a second threat level. Therefore, the requests are assigned to both different containers and different container pools, as both the user identifier and the risk level associated with the requests are different. Such separation helps ensure the security of the system and minimize the possibility of a malicious problem being able to access data associated with the same, or different, users.

Optionally, the second user identifier 332 and the first user identifier 310 are the same user identifier. In this example, the fifth container pool 372 and the sixth container pool 382 would be associated with the same user identifier. The fifth RBI request 364 and the sixth RBI request 376 would not be assigned to the same container pool, as the fifth RBI request 364 is associated with the first threat level and the sixth RBI request 376 is associated with the second threat level.

The seventh RBI request 386 is associated with the first user identifier 310 and is assigned to the fifth container 372 of the first risk container pool 316, using the process previously described. The seventh RBI request 386 is assigned to the same container pool as the fifth RBI request 364 as both RBI requests are determined to be associated with the first threat level. Optionally, the seventh RBI request 386 and the fifth RBI request 364 are assigned to different container pools, such as when the RBI requests are determined to have different threat levels as described above, or when the fifth container 372 is unavailable, e.g., the fifth container 372 is shut down or at maximum capacity.

Identification unit 320 is incorporated within security and assignment unit 312, such that security and assignment unit 312 may comprise assignment 314 and/or identification unit 320. Optionally, identification unit 320 is authorization proxy unit 212 of FIG. 2, wherein security and assignment unit 312 is security and assignment unit 208 of FIG. 2.

Optionally, the first network content 308 is a web page, and the web page is generated by a web browser executing within the first RBI container 322. Additionally, or alternatively, the non-executable representation of the first network content 324 is a pixel-based representation of the first network content 308, or an otherwise sanitized representation of the first network content 308 as previously described. The RBI request 304 is received from a user device 310, a server 302, a proxy, an intrusion prevention system and/or any electronic device and/or system. Preferably, the RBI request 304 is associated with a request 306 to isolate the first network content 308 from the first user device (X-1).

The second container pool 318 is isolated from the first container pool 316, and/or the first container pool 316 is associated with a first content access policy and the second container pool 318 is associated with a second content access policy, wherein the first content access policy may allow for persistent storage of cached data while the second content access policy may restrict the storage of cached data.

RBI requests associated with an optional third threat level are assigned to a third container pool of the plurality of container pools, and the third threat level is greater than the first threat level and less than the second threat level. For example, the first threat level is associated with low-risk network content, the second threat level is associated with high-risk network content, and the third threat level is associated with medium-risk network content. Optionally, the first threat level, second threat level, and optional third threat level, are determined by a security policy. Alternatively, the threat levels are determined by the server 302 or the user device, e.g., X-1. For example, user devices are associated with a higher or lower threat level.

System 300 may comprise any of the above-described functional units in relation to FIGS. 3A-3C in any combination and should be considered optional components to the system 300.

Optionally, system 300 is system 100 and/or system 200, such that system 300 is a system for risk-based and user-based pooling of RBI requests. For example, a container pool of a plurality of container pools, such as the first risk container pool 316 (e.g. first risk container pool 116) or the second risk container pool 318 (e.g. second risk container pool 118), is assigned based on a determined threat level, and a container of a plurality of containers within the assigned contain of the plurality of container pools, such as first RBI container 322 (e.g. first RBI container 120) or third RBI container 348 (e.g. second RBI container 126), is assigned based on a determined user identifier, such as first user identifier 310 (e.g. associated with first user device 110). A threat level associated with the first RBI request 304 (e.g. first RBI request 104) is determined and the server 302 (e.g. server 102), and the first RBI request 304 is assigned to a container pool of a plurality of container pools based on the determined threat level. RBI requests associated with a first threat level are assigned to a first container pool (e.g. the first risk container pool 316) of the plurality of container pools and RBI requests associated with a second threat level are assigned to a second container pool (e.g. the second risk container pool 318) of the plurality of container pools. A first user identifier associated with the first RBI request is determined at the server, and the first user identifier 310 is associated with a first RBI container 322 of the assigned container pool, such as first risk container pool 316. The requests associated with the first user identifier 310 and the determined threat level are handled by the first RBI container 322. Using the associated first RBI container 322 within the assigned container pool, such as first risk container pool 316, a non-executable representation 324 of the first network content 308 is generated and returned from the server 302 for access at the first user device (e.g. X-1).

The combination of risk-based and user-based pooling can result in a container pool that is not accessible by another user, such as a user associated with second user identifier 332, while the container pool is associated with the first user identifier 310. Beneficially, this can increase privacy and identity-related security as sharing of user-related data and network content-related data can be controlled between containers, and therefore between different users associated with different user identifiers. This combination simultaneously allows for the quarantine of high-risk network content, preventing malware from impacting the orchestration of other RBI requests in the assigned container pool, as another user would be assigned to different container within the container pool. Additionally, the user identifier may impact the determined threat level, for example a user identifier may be associated with network content of a higher risk and therefore the determined threat level may be higher for that user identifier.

Figure 4:
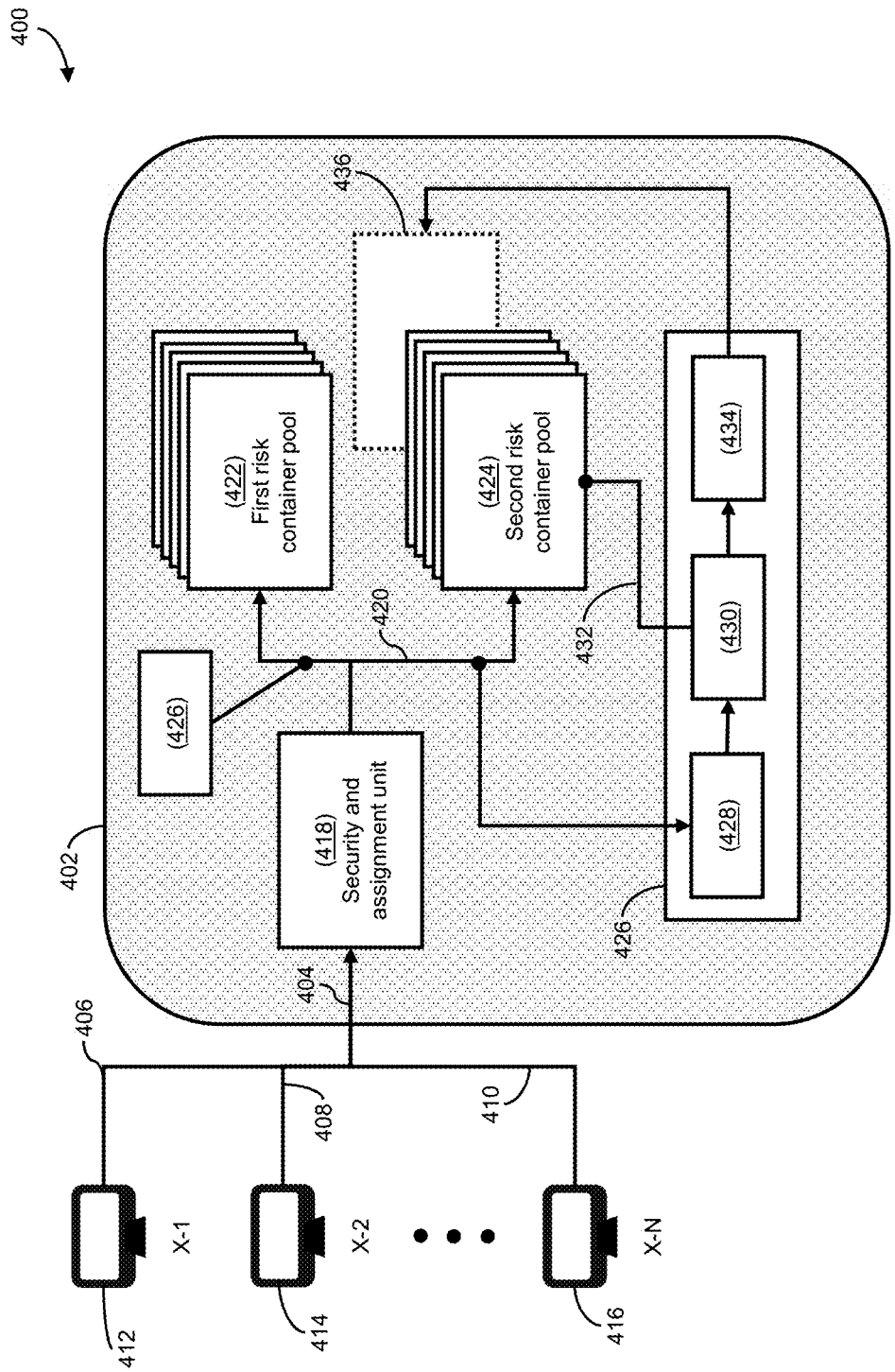
FIG. 4 shows an example of a system architecture diagram for user-based pooling of RBI requests wherein a load associated with a container pool is determined.

FIG. 4 shows an example of a system architecture diagram for user-based pooling of RBI requests, for example the system of FIGS. 3A-3C, wherein a load associated with a container pool is determined.

The system 400 for user-based pooling of RBI requests comprises a server 402, a new RBI request 404, which is associated with any of a first request to access a network content 406 at the first user device (X-1), a second request to access a network content 408 at the second user device (X-2), or a third request to access a network content 410 at another user device (X-N). The system 400 further comprises a first user identifier 412, a second user identifier 414, a third user identifier 416, a security and assignment unit 418, an assignment 420, a first risk container pool 422, a second risk container pool 424, an identification unit 426, a container identifier 428, a load determiner 430, a first current load 432, a container manager 434, and a new RBI container 436.

The server 402 receives the new RBI request 404, and the security and assignment unit 418 determines that the new RBI request 404 is associated with a threat level, for example the second threat level. The threat level is determined using information related to the user identifier associated with the new RBI request 404, the user device associated with the new RBI request 404, and/or the network content associated with the new RBI request 404, such as the URL. Based on the determined threat level, the security and assignment unit 418 provides and assignment 420 that assigns the new RBI request 404 to the relevant container pool, such as the second risk container pool 424. The assignment is modified by the identification unit 426 as previously described in FIGS. 3A-3C. The identification unit 426 may further comprise a container identifier 428, which is configured to allow for the identification of an RBI container within the assigned container pool this not associated with a user identifier separate from the user identifier associated with the new RBI request 404. For example, if the user identifier associated with the new RBI request 404 is the first user identifier 412, the container identifier 428 allows for the identification of an RBI container within the second risk container pool 424 this not associated with the second user identifier 414 or the third user identifier 416. Container identifier 428 is further configured to allow for the identification of an RBI container within the assigned container pool that is not associated with any user identifier.

The identification unit 426 preferably further comprises a load determiner 430, which is configured to determine the first current load 432 associated with the assigned container pool, and/or a container manager 434, which is configured to generate at least one new RBI container, such as new RBI container 436, when the first current load 432 exceeds a first load threshold. Optionally, the container manager 434 shuts down at least one RBI container, such as new RBI container 436, when the first current load 432 is below a second load threshold. Preferably, the at least one RBI container shut down by the container manager 434 is not associated with a user identifier. The first load threshold and/or the second load threshold is predetermined and or flexible, where the first load threshold may change during operation of system 400. For example, the first load threshold is based on operational requirements, limits associated with the assigned container pool, limits associated with the server, efficiency requirements/standards, power requirements/standards, the number of RBI requests received by the server 402, load-impacting factors, or other factors. Preferably, the second load threshold is less than the first load threshold.

The identification unit 426 may comprise of any of, in any combination, the container identifier 428, the load determiner 430, the container manager 434, or identification unit 426 is identification unit 320 of FIGS. 3A-3C.

The container manager 434 is configured to determine a first time point, wherein the first time point is the time at which the non-executable representation of the network content is returned from the server 402 for access at the associated user device, such as a non-executable representation of the network content associated with the first request to access a network content 406, which is associated with the first user identifier 412. If a predetermined time interval has passed from the first time point, the container manager 434 may shut down at least one RBI container within the identified container pool, for example the RBI container used to generate the non-executable representation of the network content, and/or the new RBI container 436. The container manager 434 is further configured to update the first time point. The first time point is updated based on the time at which the non-executable representation of a second network content is returned from the server 402, such as a non-executable representation of a network content associated with second request to access a network content 408. Optionally, the first time point is associated with a specific user identifier, such as the first user identifier 412, such that the first time point is updated if a non-executable representation of a network content is associated with the first user identifier 412, and the first time point is not updated if a non-executable representation of a network content is not associated with the first user identifier 412.

Optionally, server 402 is server 302 of FIGS. 3A-3C, server 206 of FIG. 2, and/or server 102 of FIGS. 1A-1B. For example, security and assignment unit 418 is security and assignment 312, security and assignment unit 208, and/or security and assignment unit 112. Additionally, security and assignment unit 418 may comprise any of a receiver unit 210, an authorization proxy unit 212, a policy engine unit 214, a categorization unit 216, and/or a load balancer unit 218 of FIG. 2.

Figure 5:
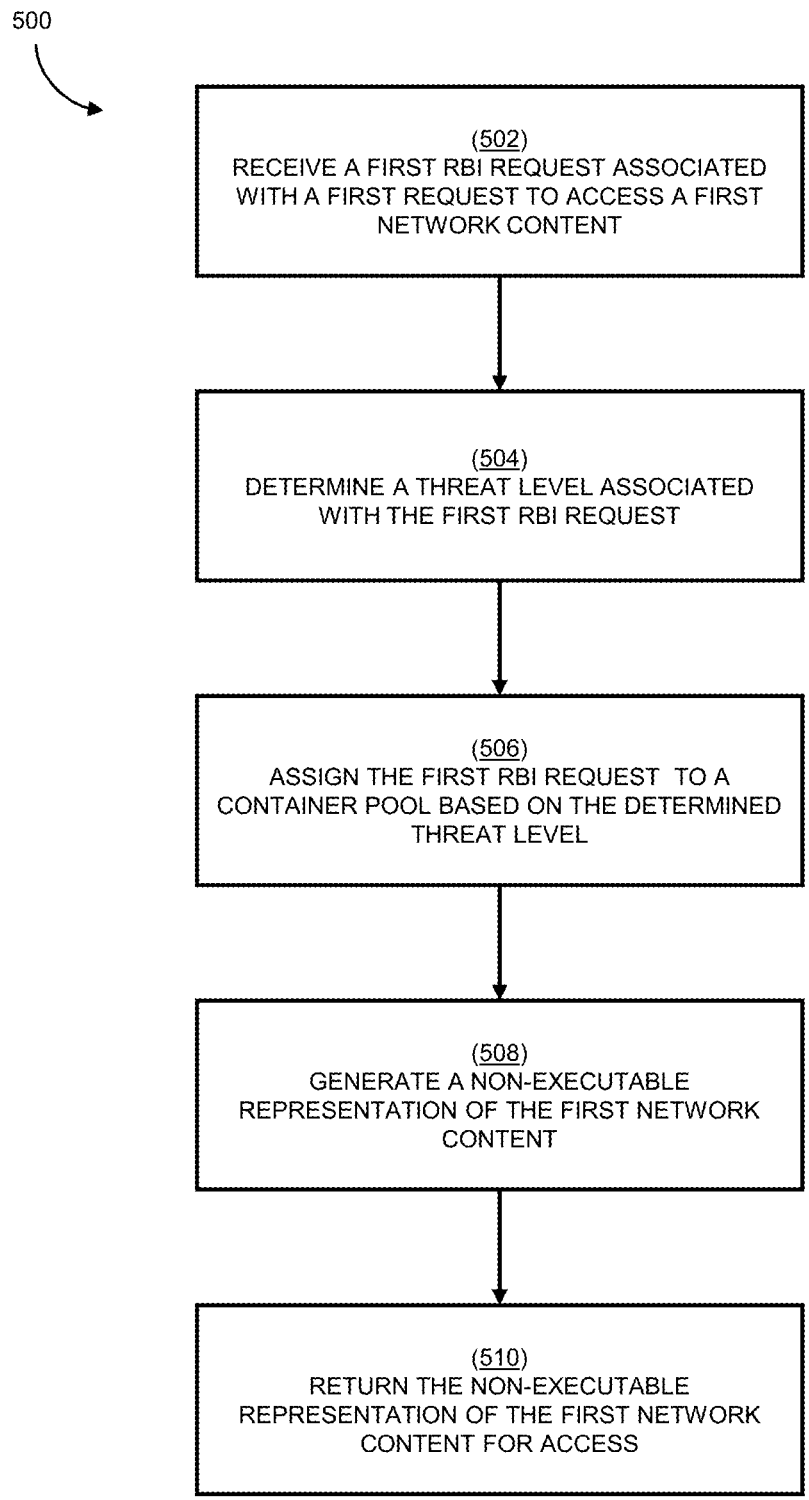
FIG. 5 shows a flowchart illustrating a method for orchestration of RBI requests.

FIG. 5 shows a flowchart illustrating a method for orchestration of RBI requests. Specifically, FIG. 5 illustrates a method 500 for performing the process described in relation to system 100 and system 200 of FIGS. 1-2, where the processes involved in the method 500 are described in detail. The method 500 comprises the following steps, which is performed in any order and in any combination, including in combination with any of the steps of method 600 and/or method 700.

Step 502 comprises receiving, at a server (e.g., server 102 of FIGS. 1A-1B), a first RBI request (e.g., first RBI request 104 of FIGS. 1A-1B) associated with a first request (e.g., first request 106 of FIGS. 1A-1B) to access a first network content (e.g., first network content 108 of FIGS. 1A-1B) at a first user device (e.g., first user device 110 of FIGS. 1A-1B). For example, the server 102 receives the first RBI request 104 from the first user device 110, which is an electrical device associated with a first user identifier. The first RBI request 104 is associated with the first request 106 to access the first network content 108 at the first user device 110.

Step 504 comprises determining, at the server (e.g., server 102 of FIGS. 1A-1B), a threat level associated with the first RBI request (e.g., first RBI request 104 of FIGS. 1A-1B). For example, the server 102 is configured to determine a threat level associated with the first RBI request 104, such as a first threat level, a second threat level, or another threat level. The first threat level is different to the second threat level. For example, the first threat level is less than the second threat level, such that requests associated with the first threat level are viewed as having lower risk than requests associated with the second threat level.

The threat level is determined according to any suitable known means. For example, the threat level is determined according to an access policy, the use of blacklists, or analysis of the requested content to identify the presence of malicious content (e.g., malicious code, phishing, out of date security certificates, multiple redirects etc.).

Step 506 comprises assigning, at the server (e.g. server 102 of FIGS. 1A-1B), the first RBI request (e.g. first RBI request 104 of FIGS. 1A-1B) to a container pool of a plurality of container pools based on the determined threat level, wherein: RBI requests associated with a first threat level are assigned to a first container pool of the plurality of container pools (e.g. first risk container pool 116 of FIGS. 1A-1B); and RBI requests associated with a second threat level are assigned to a second container pool of the plurality of container pools (second risk container pool 118 of FIGS. 1A-1B). For example, server 102 is further configured to provide an assignment 114, wherein the first RBI request 104 is assigned to a container pool based on the determined threat level, and wherein RBI requests associated with the first threat level are assigned to the first risk container pool 116 and RBI requests associated with the second threat level are assigned to the second risk container pool 118. The server 102 may comprise additional container pools not depicted here. The assignment 114 may also identify the container within the assigned container pool wherein the first RBI request 104 is assigned. A container is assigned by any computational methods, such as the first free container in a sequence, random allocation, or a user-based method as detailed below. Preferably, the first threat level is less different than to the second threat level, such as being lower than the second threat level.

Step 508 comprises generating, using a first RBI container within the assigned container pool, a non-executable representation of the first network content. For example, server 102 of FIG. 1 obtains a generated non-executable representation 122 of the first network content 108. In another example, a non-executable representation of the network content 226 of FIG. 2 associated with the first RBI request 204 is generated by the assigned container and the non-executable representation of the network content 226 is rendered so as to prevent any malicious code, such as a script language code e.g., JavaScript®, from executing on the user device. Preferably, the non-executable representation of the network content 226 is a sanitized version of the network content, such as a pixel representation of the network content. The non-executable representation of the network content 226 is generated by a browser, such as Chrome, inside the server 206, and the network content is a web page. Each container handles RBI requests from at least one web page. A user profile of network content related data, such as cache, cookies, and other downloaded content, is stored in separate directories within the server 206, as previously described in relation to FIG. 2.

Step 510 comprises returning, from the server (e.g., server 102 of FIGS. 1A-1B), the non-executable representation of the first network content for access at the first user device. For example, a returned non-executable representation 124 of the network content is then obtained by the first user device 110 from the server 102.

Optionally, RBI requests associated with an optional third threat level are assigned to a third container pool of the plurality of container pools, and the third threat level is greater than the first threat level and less than the second threat level. For example, the first threat level is associated with low-risk network content, the second threat level is associated with high-risk network content, and the third threat level is associated with medium-risk network content. Optionally, the first threat level, second threat level, and optional third threat level, are determined by a security policy.

Figure 6:
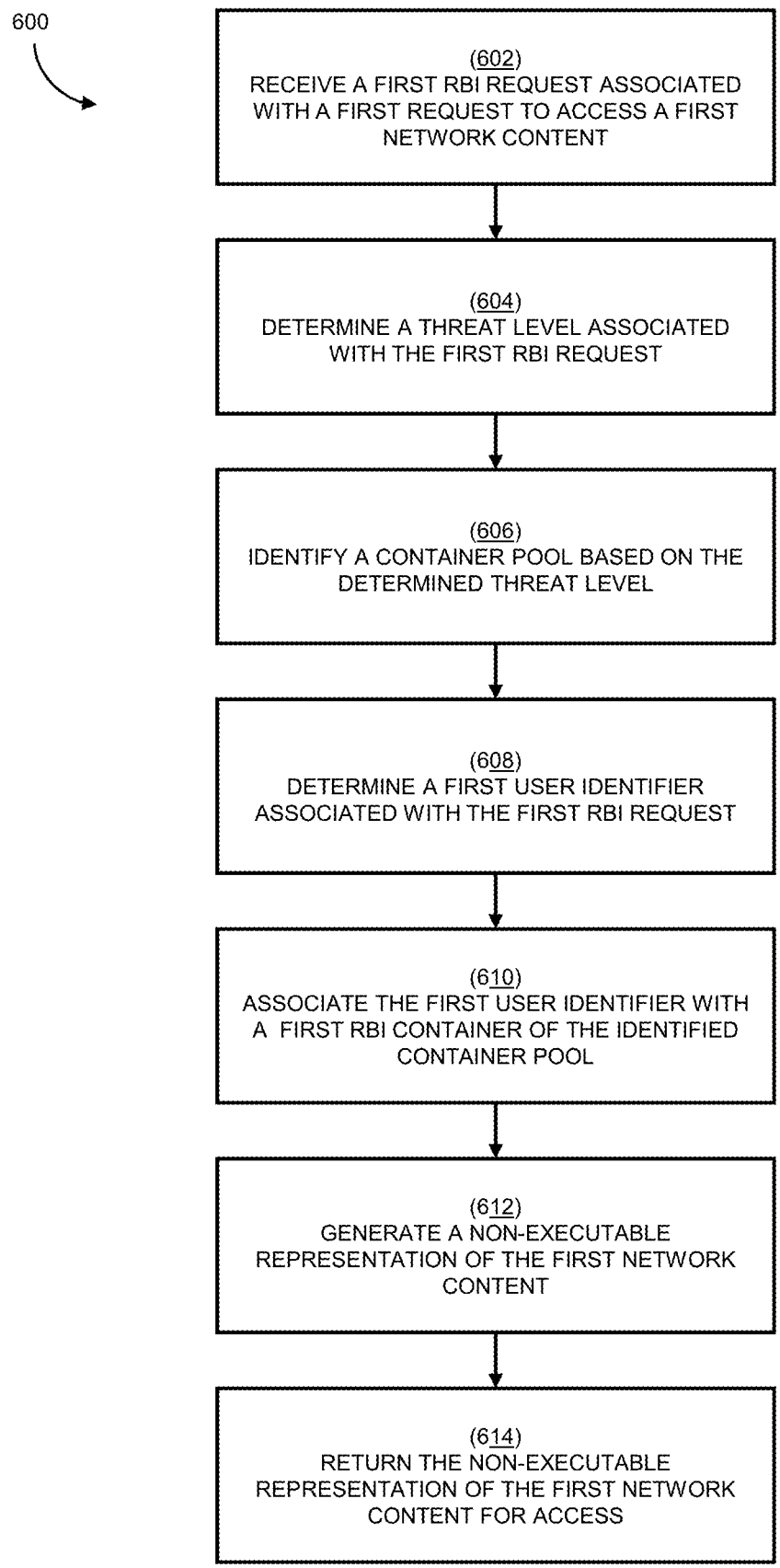
FIG. 6 shows a flowchart illustrating a method for user-based pooling of RBI requests.

FIG. 6 shows a flowchart illustrating a method for user-based pooling of RBI requests. Specifically, FIG. 6 illustrates a method 600 for performing the process described in relation to system 300 of FIGS. 3A-3C, where the processes involved in the method 600 are described in detail. Method 600 comprises the following steps, which is performed in any order and in any combination, including in combination with any of the steps of method 500 and/or method 700.

Step 602 comprises receiving, at a server (e.g., server 302 of FIGS. 3A-3C), a first RBI request (e.g., first RBI request 304 of FIGS. 3A-3C) associated with a first request (e.g., first request 306 of FIGS. 3A-3C) to access a first network content (e.g., first network content 308 of FIGS. 3A-3C) at a first user device (e.g., X-1). For example, server 302 receives the first RBI request 304, which is associated with a first request 306 to access a first network content 308 at a first user device (X-1). There is a first user identifier 310 associated with the first RBI request 304.

Step 604 comprises determining, at the server (e.g., server 302), a first threat level associated with the first RBI request (e.g., first RBI request 304). For example, server 302 determines a threat level associated with the first RBI request 304, wherein there is at least one threat level, such as a first threat level. Optional additional threat levels may comprise a second threat level that is different from the first threat level, such as being higher than the first threat level and therefore being associated with higher risk network content. The determination of the threat level preferably occurs in the same manner as described in FIG. 5 step 504.

Step 606 comprises identifying, at the server (e.g., server 302), a container pool of a plurality of container pools based on the determined threat level, the plurality of container pools comprising at least a first container pool to handle requests having a first threat level and a second container pool to handle requests having a second threat level. For example, server 302 identifies a container pool from a plurality of container pools based on the determined threat level. Server 302 then assigns the first RBI request 304 to the identified container pool, for example the first risk container pool 316. The plurality of container pools comprises at least the first risk container pool 316 and a second risk container pool 318. The first risk container pool 316 handles requests associated with the first threat level and the second risk container pool 318 handles requests associated requests not associated with the first threat level, such as requests associated with a second threat level. Beneficially, this allows for container pools associated with a higher threat level to be quarantined or otherwise isolated from container pools associated with a lower threat level, increasing the security and efficiency of the system.

Step 608 comprises determining, at the server (e.g., server 302), a first user identifier (e.g., first user identifier 310) associated with the first RBI request (e.g., first RBI request 304). For example, the first user identifier 310 associated with the first RBI request 304 is determined by the server 302, such as by using a user authentication process.

Step 610 comprises associating, at the server (e.g., server 302), the first user identifier (e.g., first user identifier 310) with a first RBI container (e.g., first RBI container 322) of the identified container pool such that requests associated with the first user identifier and the determined threat level, for example the first threat level, are handled by the first RBI container. For example, the first user identifier 310 is associated with a first RBI container 322 of a first threat level, and therefore the identified container pool is the first risk container pool 316 and requests associated with the first user identifier 310 and the first threat level are handled by the first RBI container 322. Any requests associated with the first user identifier 310 and the second threat level are handled by a container of the second risk container pool 318. Beneficially, this allows for multiple requests from the same user associated with a user identifier to be handled by the same container. For a container pool with persistent storage of cached data or stored user profiles, this results in an improved and more efficient process between the user and the network content. It may also allow for increases in security of the user device and/or the server, as user-server-network content interaction can be more effectively monitored.

Step 612 comprises generating, using the first RBI container (e.g., first RBI container 322) within the identified RBI container, a non-executable representation of the first network content (e.g., the non-executable representation of the first network content 324).

Step 614 comprises returning, from the server, the non-executable representation (e.g., the non-executable representation of the first network content 324) of the first network content (e.g., first network content 306) for access at the first user device (e.g., X-1).

Optionally, RBI requests associated with an optional third threat level are assigned to a third container pool of the plurality of container pools, and the third threat level is greater than the first threat level and less than the second threat level. For example, the first threat level is associated with low-risk network content, the second threat level is associated with high-risk network content, and the third threat level is associated with medium-risk network content. Optionally, the first threat level, second threat level, and optional third threat level, are determined by a security policy.

Figure 7:
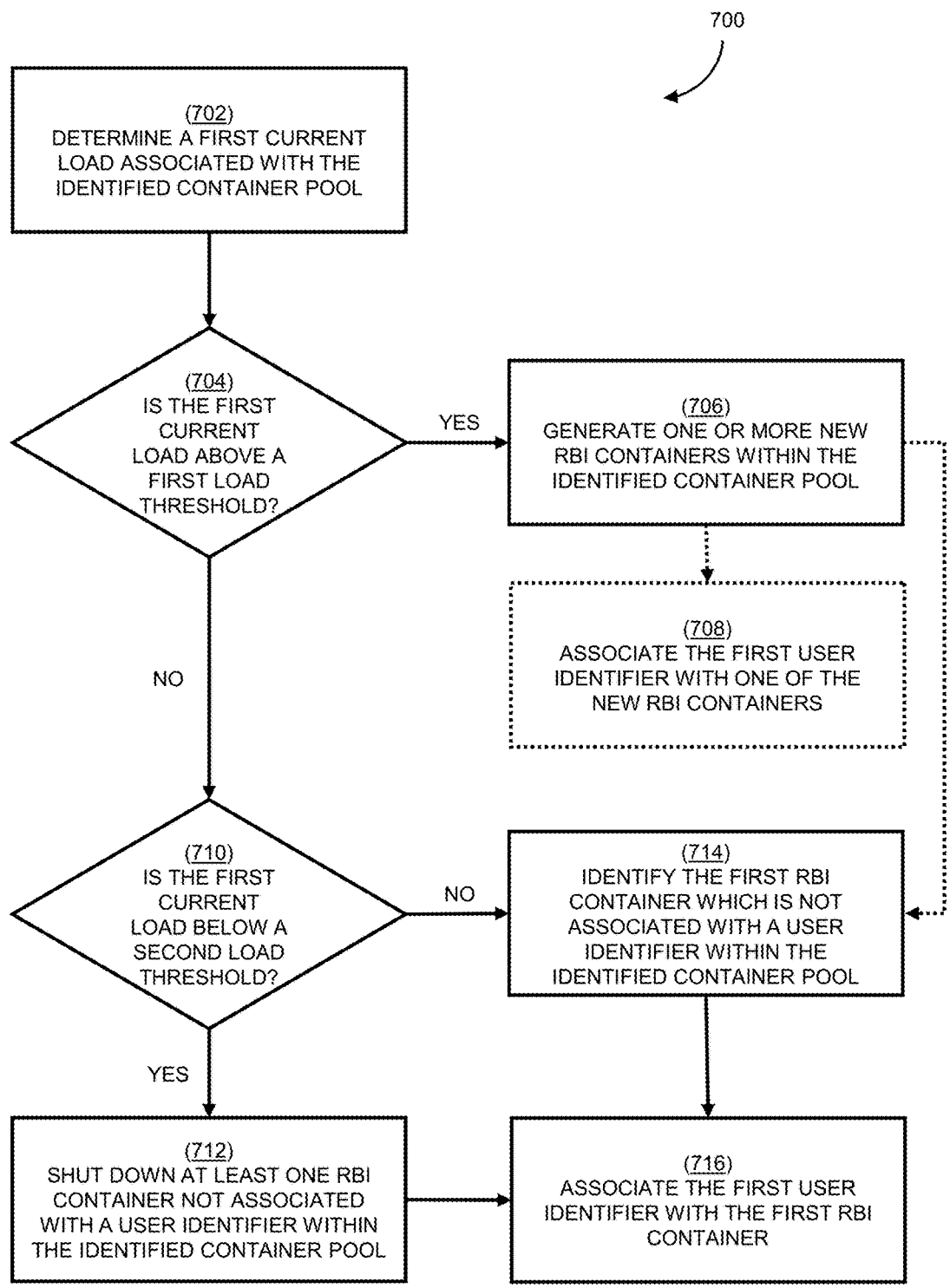
FIG. 7 shows a flowchart illustrating a method for user-based pooling of RBI requests wherein a load associated with a container pool is determined.

FIG. 7 shows a flowchart illustrating a method for user-based pooling of RBI requests wherein a load associated with a container pool is determined. Specifically, FIG. 7 illustrates a method 700 for performing the process described in relation to system 400 of FIG. 4, where the processes involved in the method 700 are described in detail. Method 700 comprises the following steps, which is performed in any order and in any combination, including in combination with any of the steps of method 500 and/or method 600.

Step 702 comprises determining, by the server (e.g., server 402 of FIG. 4), a first current load (e.g., first current load 432) with the identified container pool. For example, the server 402 may receive a new RBI request 404, and the server 402 subsequently determines that the new RBI request 404 is associated with a threat level, such as a second threat level. Based on the determined threat level, the server 402 assigns the new RBI request 404 to the relevant container pool, such as the second risk container pool 424. The server 402 is further configured to determine the first current load 432 associated with the assigned container pool.

Step 704 comprises determining, by the server (e.g., server 402), whether the first current load exceeds a first load threshold. For example, the server 402 is further configured to monitor or otherwise determine the first current load and compare or otherwise monitor for the first load threshold. The first load threshold and/or the first current load is based on operational requirements, limits associated with the assigned container pool, limits associated with the server, efficiency requirements/standards, power requirements/standards, load-impacting factors such as the number of RBI requests received by the server 402 and user-related traffic, and/or other known factors.

In accordance with the determination that the first current load exceeds the first load threshold, step 706 comprises generating, by the server, at least one new RBI container within the identified container pool when the first current load exceeds a first load threshold. For example, the server 402 is configured to generate a new container when the first current load exceeds the first load threshold to increase the number of containers available. Beneficially, this allows for an increase in RBI requests executed, processed, or otherwise actioned by server 402 without requiring a back-log of unfulfilled RBI requests.

Step 708, which is an optional step proceeding step 706, comprises associating the first user identifier with one or more new RBI containers. For example, server 402 is further configured to assign any RBI request associated with the first user identifier 412, such as the first RBI request 404, to the newly generated RBI container.

In accordance with the determination that the first current load does not exceed the first load threshold, step 710 comprises determining, by the server, whether the first current load is below a second load threshold. For example, server 402 is further configured to monitor or otherwise determine the first current load and compare or otherwise monitor for the second load threshold. The second load threshold is based on operational requirements, limits associated with the assigned container pool, limits associated with the server, efficiency requirements/standards, power requirements/standards, load-impacting factors such as the number of RBI requests received by the server 402 and user-related traffic, and/or other factors not listed here.

In accordance with the determination that the first current load does not exceed the second load threshold, step 712 comprises shutting down, by the server, at least one RBI container within the identified container pool when the first current load is below a second load threshold, wherein the at least one RBI container is not associated with a user identifier. For example, server 402 is further configured to shut down a newly generated RBI container, an older RBI container, and/or an RBI container from a container pool with the lowest current load. Beneficially, this allows for any increase in RBI requests executed, processed, or otherwise actioned by server 402 to be temporary based on the current load associated with the plurality of container pools. This also allows for increases in efficiency. For example, energy and computational resources can be saved or repurposed as resources are not required to maintain containers that are not in use or otherwise required by server 402.

In accordance with the determination that the first current load exceeds the second load threshold, step 714 comprises identifying, by the server, the first RBI container within the identified container pool, wherein the first RBI container is not associated with a user identifier. For example, server 402 is further configured to identify a container within the assigned container pool that is not associated to a user identifier 414 or user identifier 416, or any other user identifier. Beneficially, this allows for identification of a container that is not currently in use or otherwise assigned to a different request. Optionally, the server 402 is further configured to identify a container pool within the assigned container pool that is already associated with user identifier 412, which is the user identifier associated with the new RBI request 404. Beneficially, this allows for RBI requests associated with a particular user identifier to be handled by the same container within the assigned container pool.

Step 716 comprises associating the first user identifier with the first RBI container. For example, the server 402 is configured to associate the above identified container within the assigned container pool, which is not currently associated with any user identifier, to be associated with the first user identifier 412 associated with the new RBI request 404. Beneficially, requests associated with the first user identifier 412 may all be handled by the same associated container, even from different user devices. In this way the first user experiences a minimum amount of disruption in their browsing experience.

Optionally, step 710 may further comprise determining, by the server, a first time point, wherein the first time point is the time at which the non-executable representation of the first network content is returned from the server for access at the first user device. In accordance with a predetermined time interval having passed from the first time point, step 712 may further comprise shutting down, by the server, at least one RBI container within the identified container pool. The predetermined time interval is preferably based on access policies, the user identifier, or a specific time interval, such as ten minutes. Beneficially, this allows for containers that are no longer in use to be shut down, and resources can be saved or otherwise reallocated by the server. Additionally, the server is further configured to update the first time point, such that the first time point is the time at which the non-executable representation of a second network content associated with a second RBI request is returned from the server for access.

For example, a user associated with the first user identifier 412 may have received a non-executable representation of the first network content at a first time point. The container is associated with the first user identifier 412 and is isolated, such that the container associated with the first user identifier 412 cannot be associated with a different user identifier. A second RBI request associated with the first user identifier 412 is received within the predetermined time interval, which is determined to be associated with the same threat level as the first RBI request. Therefore, the same container associated with the first user identifier 412 handles the second RBI request, a non-executable representation of a second network content is returned, and the first time point is updated. After the predetermined time interval has passed, the container associated with the first user identifier 412 is shut down. Beneficially, this allows for, in example, persistent storage of cached data related to the first user identifier 412 to be maintained throughout repeat usage of a container associated with the first user identifier 412, while also allowing for resources to be saved or otherwise reallocated by the server when the container is no longer required by the user associated with the first user identifier 412.

Optionally, RBI requests associated with an optional third threat level are assigned to a third container pool of the plurality of container pools, and the third threat level is greater than the first threat level and less than the second threat level. For example, the first threat level is associated with low-risk network content, the second threat level is associated with high-risk network content, and the third threat level is associated with medium-risk network content. Optionally, the first threat level, second threat level, and optional third threat level, are determined by a security policy.

Optionally, the steps of method 500, method 600 and/or method 700 are combined. For example, a combined method may include step 502 (e.g. step 602), step 504 (e.g. step 604), step 606, step 506, step 608, step 610, step 508 (e.g. step 612), and step 510 (e.g. step 614).

Therefore, in this embodiment the combined method comprises: receiving, at a server (e.g., server 102 of FIGS. 1A-1B and/or server 302 of FIGS. 3A-3C), a first RBI request (e.g., first RBI request 104 of FIGS. 1A-1B and/or first RBI request 304 of FIGS. 3A-3C) associated with a first request (e.g., first request 106 of FIGS. 1A-1B and/or first request 306 of FIGS. 3A-3C) to access a first network content (e.g., first network content 108 of FIGS. 1A-1B and/or first network content 308 of FIGS. 3A-3C) at a first user device (e.g., first user device 110 of FIGS. 1A-1B and/or X-1); determining, at the server, a threat level associated with the first RBI request; identifying, at the server, a container pool of a plurality of container pools based on the determined threat level, the plurality of container pools comprising at least a first container pool to handle requests having a first threat level and a second container pool to handle requests having a second threat level, further comprising assigning, at the server, the first RBI request to a container pool of a plurality of container pools based on the determined threat level, wherein RBI requests associated with a first threat level are assigned to a first container pool of the plurality of container pools (e.g. first risk container pool 116 or first risk container pool 316) and RBI requests associated with a second threat level are assigned to a second container pool of the plurality of container pools (second risk container pool 118 or second risk container pool 318); determining a first user identifier (e.g., first user identifier 310) associated with the first RBI request; associating the first user identifier with a first RBI container (e.g., first RBI container 120 or first RBI container 322) of the identified container pool such that requests associated with the first user identifier and the determined threat level, for example the first threat level, are handled by the first RBI container; generating, using a first RBI container within the assigned container pool, a non-executable representation of the first network content; and returning, from the server, the non-executable representation of the first network content (e.g. returned non-executable representation 124 or non-executable representation 324) for access at the first user device.

The combination of risk-based and user-based pooling can result in a container pool that is not accessible by another user, such as a user associated with second user identifier 332, while the container pool is associated with the first user identifier 310. Beneficially, this can increase privacy and identity-related security as sharing of user-related data and network content-related data can be controlled between containers, and therefore between different users associated with different user identifiers. This combination simultaneously allows for the quarantine of high-risk network content, preventing malware from impacting the orchestration of other RBI requests in the assigned container pool, as another user would be assigned to different container within the container pool. Additionally, the user identifier may impact the determined threat level, for example a user identifier may be associated with network content of a higher risk and therefore the determined threat level may be higher for that user identifier.

Optionally, a combined method may include step 502 (e.g. step 602), step 504 (e.g. step 604), step 606, step 506, step 608, step 702, step 704, step 706, step 708 (e.g. step 610), step 508 (e.g. step 612), and step 510 (e.g. step 614). Another combined method may include step 502 (e.g. step 602), step 504 (e.g. step 604), step 606, step 506, step 608, step 702, step 704, step 710, step 714, step 716 (e.g. step 610), step 508 (e.g. step 612), and step 510 (e.g. step 614). Another combined method may include step 502 (e.g. step 602), step 504 (e.g. step 604), step 606, step 506, step 608, step 702, step 704, step 710, step 712, step 716 (e.g. step 610), step 508 (e.g. step 612), and step 510 (e.g. step 614).

The steps of method 500, method 600, and/or method 700 are performed using a computer implemented method. For example, a computer readable medium, which is transitory or non-transitory, having stored thereon computer executable code that, when executed by one or more processors, perform the steps of any of method 500, method 600, and/or method 700. In another example, a system comprising one or more processors and a memory storing instructions which when executed cause the one or more processors to perform the steps of any of method 500, method 600, and/or method 700.

Figure 8:
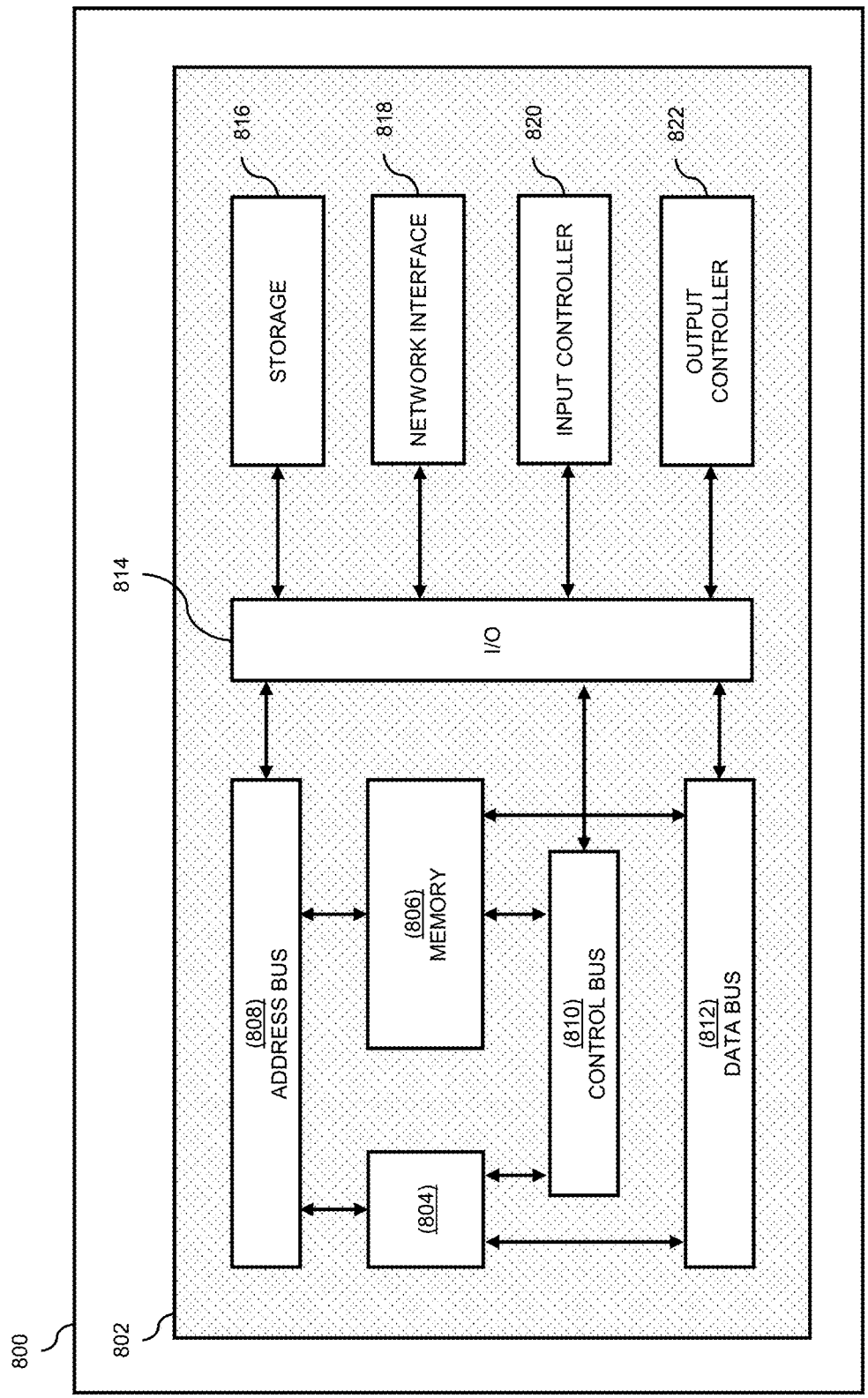
FIG. 8 shows an example computing system for orchestration of RBI requests according to embodiments of the present disclosure.

FIG. 8 shows an example computing system for orchestration of RBI requests. Specifically, FIG. 8 shows a block diagram of an embodiment of a computing system according to example embodiments of the present disclosure.

Computing system 800 can be configured to perform any of the operations disclosed herein such as, for example, any of the operations discussed with reference to the functional units described in relation to FIGS. 1A-B, 2, 3A-C, and 4-7. Computing system includes one or more computing device(s) 802. Computing device(s) 802 of computing system 800 comprise one or more processors 804 and memory 806. One or more processors 804 can be any general purpose processor(s) configured to execute a set of instructions. For example, one or more processors 804 can be one or more general-purpose processors, one or more field programmable gate array (FPGA), and/or one or more application specific integrated circuits (ASIC). In one embodiment, one or more processors 804 include one processor. Alternatively, one or more processors 804 include a plurality of processors that are operatively connected. One or more processors 804 are communicatively coupled to memory 806 via address bus 808, control bus 810, and data bus 812. Memory 806 can be a random access memory (RAM), a read only memory (ROM), a persistent storage device such as a hard drive, an erasable programmable read only memory (EPROM), and/or the like. Computing device(s) 802 further comprise I/O interface 814 communicatively coupled to address bus 808, control bus 810, and data bus 812.

Memory 806 can store information that can be accessed by one or more processors 804. For instance, memory 806 (e.g., one or more non-transitory computer-readable storage mediums, memory devices) can include computer-readable instructions (not shown) that can be executed by one or more processors 804. The computer-readable instructions can be software written in any suitable programming language or can be implemented in hardware. Additionally, or alternatively, the computer-readable instructions can be executed in logically and/or virtually separate threads on one or more processors 804. For example, memory 806 can store instructions (not shown) that when executed by one or more processors 804 cause one or more processors 804 to perform operations such as any of the operations and functions for which computing system 800 is configured, as described herein. In addition, or alternatively, memory 806 can store data (not shown) that can be obtained, received, accessed, written, manipulated, created, and/or stored. The data can include, for instance, the data and/or information described herein in relation to FIGS. 1 to 7. In some implementations, computing device(s) 802 can obtain from and/or store data in one or more memory device(s) that are remote from the computing system 800.

Computing system 800 further comprises storage unit 816, network interface 818, input controller 820, and output controller 822. Storage unit 816, network interface 818, input controller 820, and output controller 822 are communicatively coupled to central control unit via I/O interface 814.

Storage unit 816 is a computer readable medium, preferably a non-transitory computer readable medium, comprising one or more programs, the one or more programs comprising instructions which when executed by the one or more processors 804 cause computing system 800 to perform the method steps of the present disclosure. Alternatively, storage unit 816 is a transitory computer readable medium. Storage unit 816 can be a persistent storage device such as a hard drive, a cloud storage device, or any other appropriate storage device.

Network interface 818 can be a Wi-Fi module, a network interface card, a Bluetooth module, and/or any other suitable wired or wireless communication device. In an embodiment, network interface 818 is configured to connect to a network such as a local area network (LAN), or a wide area network (WAN), the Internet, or an intranet.

At this point it should be noted that orchestration of RBI requests in accordance with the present disclosure as described above may involve the processing of input data and the generation of output data to some extent. This input data processing and output data generation is implemented in hardware or software. For example, specific electronic components are employed in a control module or similar or related circuitry for implementing the functions associated orchestration of RBI requests in accordance with the present disclosure as described above. Alternatively, one or more processors operating in accordance with instructions may implement the functions associated with orchestration of RBI requests in accordance with the present disclosure as described above. If such is the case, it is within the scope of the present disclosure that such instructions are stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure is beneficially implemented in any number of environments for any number of purposes. Accordingly, the statements set forth below should be construed in view of the full breadth and spirit of the present disclosure as described herein.

The following numbered statements of invention are directed to various example embodiments of the invention described in the above disclosure. Due to the nature of the invention, different presentations of the above disclosure are possible, and therefore the following numbered statements are for increased understanding only. The following statements of invention are not intended to alter the protection sought for the invention, which is instead described in the claims

NUMBERED STATEMENTS OF INVENTION

1. A computer-implemented method for orchestration of remote browser isolation requests, the method comprising: receiving, at a server, a first remote browser isolation (RBI) request associated with a first request to access a first network content at a first user device; determining, at the server, a threat level associated with the first RBI request; assigning, at the server, the first RBI request to a container pool of a plurality of container pools based on the determined threat level, wherein: RBI requests associated with a first threat level are assigned to a first container pool of the plurality of container pools; and RBI requests associated with a second threat level are assigned to a second container pool of the plurality of container pools; wherein the first threat level is different to the second threat level; generating, using a first RBI container within the assigned container pool, a non-executable representation of the first network content; and returning, from the server, the non-executable representation of the first network content for access at the first user device.

2. The method of statement 1 wherein the first network content is a web page.

3. The method of statement 2 wherein the web page is generated by a web browser executing within the first RBI container.

4. The method of any preceding statement wherein the non-executable representation of the first network content is a pixel-based representation of the first network content.

5. The method of any preceding statement wherein the second container pool is isolated from the first container pool.

6. The method of any preceding statement wherein the first container pool is associated with a first content access policy and the second container pool is associated with a second content access policy.

7. The method of statement 6 wherein the first content access policy allows persistent storage of cached data.

8. The method of statement 6 or 7 wherein the second content access policy restricts the storage of cached data.

9. The method of any preceding statement wherein RBI requests associated with a third threat level are assigned to a third container pool of the plurality of container pools, and wherein the third threat level is greater than the first threat level and less than the second threat level.

10. The method of any preceding statement wherein the threat level associated with the RBI request is determined by a security policy.

11. The method of any preceding statement wherein the RBI request is received from a proxy.

12. The method of any preceding statement wherein the RBI request is received from an intrusion prevention system.

13. The method of any preceding statement wherein the RBI request is associated with a request to isolate the first network content from the first user device.

14. The method of any preceding statement further comprising: determining, at the server, a first user identifier associated with the first RBI request; associating, at the server, the first user identifier with the first RBI container of the assigned container pool such that requests associated with the first user identifier and the determined first threat level are handled by the first RBI container.

15. The method of any preceding statement further comprising: determining, by the server, a first current load associated with the assigned container pool; and generating, by the server, at least one new RBI container within the assigned container pool when the first current load exceeds a first load threshold.

16. The method of statement 15, further comprising: shutting down, by the server, at least one RBI container within the assigned container pool when the first current load is below a second load threshold.

17. The method of statement 15 or 16, further comprising: determining, by the server, a first time point, wherein the first time point is the time at which the non-executable representation of the first network content is returned from the server for access at the first user device; and if a predetermined time interval has passed from the first time point, shutting down, by the server, at least one RBI container within the identified container pool.

18. A computer readable medium having stored thereon computer executable code that, when executed by one or more processors, perform the steps of any of statements 1-17.

19. The computer readable medium of statement 14 wherein the medium is non-transitory.

20. A system comprising one or more processors and a memory storing instructions which, when executed by the one or more processors, cause the system to perform the steps of any of statements 1-17.

21. A computer-implemented method for user-based pooling of remote browser isolation requests, the method comprising: receiving, at a server, a first remote browser isolation (RBI) request associated with a first request to access a first network content at a first user device; determining, at the server, a first threat level associated with the first RBI request; identifying, at the server, a container pool of a plurality of container pools based on the first threat level, the plurality of container pools comprising at least a first container pool to handle requests having a first threat level and a second container pool to handle requests having a second threat level, wherein the first threat level is different to the second threat level; determining, at the server, a first user identifier associated with the first RBI request; associating, at the server, the first user identifier with a first RBI container of the identified container pool such that requests associated with the first user identifier and the determined first threat level are handled by the first RBI container; generating, using the first RBI container within the identified RBI container, a non-executable representation of the first network content; and returning, from the server, the non-executable representation of the first network content for access at the first user device.

22. The method of statement 21 wherein the first user identifier is a unique identifier associated with a user of the first user device.

23. The method of statement 22 wherein the first user identifier is determined by a user authentication process.

24. The method of any of statements 21 to 23 wherein the first RBI container is uniquely associated with the first user identifier such that the first RBI container handles requests associated with the first user identifier and the first threat level.

25. The method of any of statements 21 to 23 wherein the step of associating the first user identifier with the first RBI container comprises: identifying, by the server, the first RBI container within the identified container pool, wherein the first RBI container is not associated with a user identifier.

26. The method of statement 25 wherein the step of associating the first user identifier with the first RBI container further comprises: determining, by the server, a first current load associated with the identified container pool; and generating, by the server, at least one new RBI container within the identified container pool when the first current load exceeds a first load threshold.

27. The method of statement 26 wherein the step of associating the first user identifier with the first RBI container further comprises: shutting down, by the server, at least one RBI container within the identified container pool when the first current load is below a second load threshold, wherein the at least one RBI container is not associated with a user identifier.

28. The method of any of statements 21-27, further comprising: determining, by the server, a first time point, wherein the first time point is the time at which the non-executable representation of the first network content is returned from the server for access at the first user device; and if a predetermined time interval has passed from the first time point, shutting down, by the server, at least one RBI container within the identified container pool.

29. The method of statement 28, further comprising updating the first time point, such that the first time point is the time at which the non-executable representation of a second network content associated with a second RBI request is returned from the server for access.

30. The method of any of statements 21 to 29 wherein the first network content is a web page.

31. The method of statement 30 wherein the web page is generated by a web browser executing within the first RBI container.

32. The method of any of statements 21 to 31 wherein the non-executable representation of the first network content is a pixel-based representation of the first network content.

33. The method of any of statements 21 to 32 wherein the second container pool is isolated from the first container pool.

34. The method of any of statements 21 to 33 wherein the first container pool is associated with a first content access policy and the second container pool is associated with a second content access policy.

35. The method of statement 34 wherein the first content access policy allows persistent storage of cached data.

36. The method of statement 34 or 35 wherein the second content access policy restricts the storage of cached data.

37. The method of any of statements 21 to 36 wherein RBI requests associated with a third threat level are assigned to a third container pool of the plurality of container pools, and wherein the third threat level is greater than the first threat level and less than the second threat level.

38. The method of any of statements 21 to 37 wherein the threat level associated with the RBI request is determined by a security policy.

39. The method of any of statements 21 to 28 wherein the RBI request is received from a proxy.

40. The method of any of statements 21 to 39 wherein the RBI request is received from an intrusion prevention system.

41. The method of any of statements 21 to 40 wherein the RBI request is associated with a request to isolate the first network content from the first user device.

42. The method of any of statements 21 to 40 further comprising: assigning, at the server, the first RBI request to the container pool of the plurality of container pools based on the first threat level.

43. A computer readable medium having stored thereon computer executable code that, when executed by one or more processors, perform the steps of any of statements 21 to 42.

44. The computer readable medium of statement 43 wherein the medium is non-transitory.

45. A system comprising one or more processors and a memory storing instructions which when executed cause the one or more processors to perform the steps of any of statements 21 to 42.

What is claimed is:

1. A computer-implemented method for orchestration of remote browser isolation requests, the method comprising:
    receiving, at a server, a first remote browser isolation (RBI) request associated with a first request to access a first network content at a first user device;
    determining, at the server, a threat level associated with the first RBI request;
    assigning, at the server, the first RBI request to a container pool of a plurality of container pools based on the determined threat level, wherein:
        RBI requests associated with a first threat level are assigned to a first container pool of the plurality of container pools; and
        RBI requests associated with a second threat level are assigned to a second container pool of the plurality of container pools,
        wherein the first threat level is different to the second threat level;
    generating, using a first RBI container within the assigned container pool, a non-executable representation of the first network content; and
    returning, from the server, the non-executable representation of the first network content for access at the first user device.

2. The method of claim 1, wherein the first network content is a web page.

3. The method of claim 2, wherein the web page is generated by a web browser executing within the first RBI container.

4. The method of claim 1, wherein the non-executable representation of the first network content is a pixel-based representation of the first network content.

5. The method of claim 1, wherein the second container pool is isolated from the first container pool.

6. The method of claim 1, wherein the first container pool is associated with a first content access policy and the second container pool is associated with a second content access policy.

7. The method of claim 6, wherein the first content access policy allows persistent storage of cached data.

8. The method of claim 6, wherein the second content access policy restricts storage of cached data.

9. The method of claim 1, wherein RBI requests associated with a third threat level are assigned to a third container pool of the plurality of container pools, and wherein the third threat level is greater than the first threat level and less than the second threat level.

10. The method of claim 1, wherein the threat level associated with the RBI request is determined by a security policy.

11. The method of claim 1, wherein the RBI request is received from a proxy.

12. The method of claim 1, wherein the RBI request is received from an intrusion prevention system.

13. The method of claim 1, wherein the RBI request is associated with a request to isolate the first network content from the first user device.

14. The method of claim 1, further comprising:
    determining, at the server, a first user identifier associated with the first RBI request; and
    associating, at the server, the first user identifier with the first RBI container of the assigned container pool such that requests associated with the first user identifier and the determined first threat level are handled by the first RBI container.

15. The method of claim 1, further comprising:
    determining, by the server, a first current load associated with the assigned container pool; and
    generating, by the server, at least one new RBI container within the assigned container pool when the first current load exceeds a first load threshold.

16. The method of claim 15, further comprising:
    shutting down, by the server, at least one RBI container within the assigned container pool when the first current load is below a second load threshold.

17. The method of claim 15, further comprising:
    determining, by the server, a first time point, wherein the first time point is the time at which the non-executable representation of the first network content is returned from the server for access at the first user device; and
    if a predetermined time interval has passed from the first time point, shutting down, by the server, at least one RBI container within the assigned container pool.

18. A non-transitory computer readable medium having stored thereon computer executable code that, when executed by one or more processors, performs the steps of:
    receiving, at a server, a first remote browser isolation (RBI) request associated with a first request to access a first network content at a first user device;
    determining, at the server, a threat level associated with the first RBI request;
    assigning, at the server, the first RBI request to a container pool of a plurality of container pools based on the determined threat level, wherein:
        RBI requests associated with a first threat level are assigned to a first container pool of the plurality of container pools, and
        RBI requests associated with a second threat level are assigned to a second container pool of the plurality of container pools,
        wherein the first threat level is different to the second threat level;
    generating, using a first RBI container within the assigned container pool, a non-executable representation of the first network content; and
    returning, from the server, the non-executable representation of the first network content for access at the first user device.

19. A system comprising one or more processors and a memory storing instructions which, when executed by the one or more processors, cause the system to perform the steps of:
    receiving, at a server, a first remote browser isolation (RBI) request associated with a first request to access a first network content at a first user device;
    determining, at the server, a threat level associated with the first RBI request;

assigning, at the server, the first RBI request to a container pool of a plurality of container pools based on the determined threat level, wherein:
   RBI requests associated with a first threat level are assigned to a first container pool of the plurality of container pools, and
   RBI requests associated with a second threat level are assigned to a second container pool of the plurality of container pools,
   wherein the first threat level is different to the second threat level;
generating, using a first RBI container within the assigned container pool, a non-executable representation of the first network content; and
returning, from the server, the non-executable representation of the first network content for access at the first user device.

* * * * *